US010414979B2

(12) United States Patent
Ogawa et al.

(10) Patent No.: US 10,414,979 B2
(45) Date of Patent: Sep. 17, 2019

(54) COMPOSITION AND LIQUID CRYSTAL DISPLAY DEVICE USING THE SAME

(71) Applicant: DIC CORPORATION, Tokyo (JP)

(72) Inventors: Shinji Ogawa, Kita-adachi-gun (JP); Makoto Negishi, Kita-adachi-gun (JP); Yoshinori Iwashita, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 31 days.

(21) Appl. No.: 15/514,592

(22) PCT Filed: Aug. 25, 2015

(86) PCT No.: PCT/JP2015/073825
§ 371 (c)(1),
(2) Date: Mar. 27, 2017

(87) PCT Pub. No.: WO2016/056313
PCT Pub. Date: Apr. 14, 2016

(65) Prior Publication Data
US 2017/0226420 A1    Aug. 10, 2017

(30) Foreign Application Priority Data
Oct. 9, 2014  (JP) ................. 2014-208049

(51) Int. Cl.
| G02F 1/1333 | (2006.01) |
| C09K 19/30 | (2006.01) |
| C09K 19/12 | (2006.01) |
| C09K 19/20 | (2006.01) |
| C09K 19/34 | (2006.01) |
| G02F 1/1343 | (2006.01) |
| C09K 19/44 | (2006.01) |
| C09K 19/04 | (2006.01) |

(52) U.S. Cl.
CPC .......... *C09K 19/3003* (2013.01); *C09K 19/12* (2013.01); *C09K 19/20* (2013.01); *C09K 19/3066* (2013.01); *C09K 19/3402* (2013.01); *C09K 19/44* (2013.01); *G02F 1/134363* (2013.01); *C09K 2019/0448* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3021* (2013.01); *C09K 2019/3025* (2013.01); *C09K 2019/3422* (2013.01); *G02F 2001/134372* (2013.01)

(58) Field of Classification Search
CPC .... C09K 19/3003; C09K 19/12; C09K 19/20; C09K 19/3066; C09K 19/3402; C09K 19/44; C09K 2019/0448; C09K 2019/0466; C09K 2019/122; C09K 2019/123; C09K 2019/124; C09K 2019/3004; C09K 2019/3009; C09K 2019/301; C09K 2019/3016; C09K 2019/3019; C09K 2019/3021; C09K 2019/3025; C09K 2019/3422; G02F 1/1333; G02F 1/134363; G02F 2001/134372
USPC ....................................... 252/299.61
See application file for complete search history.

(56) References Cited

U.S. PATENT DOCUMENTS

| 9,045,684 B2 * | 6/2015 | Gotoh ............... C09K 19/3402 |
| 9,873,834 B2 * | 1/2018 | Goebel ............ C09K 19/3003 |
| 2014/0110630 A1 | 4/2014 | Goebel et al. |

FOREIGN PATENT DOCUMENTS

| CN | 103834414 A | 6/2014 |
| JP | 9-124529 A | 5/1997 |
| JP | 2006-169472 A | 6/2006 |
| JP | 2008-37918 A | 2/2008 |
| JP | 2008-38018 A | 2/2008 |
| JP | 2010-275390 A | 12/2010 |
| JP | 2011-52120 A | 3/2011 |
| JP | 2014-12836 A | 1/2014 |
| JP | 2014-62185 A | 4/2014 |
| JP | 2014-62186 A | 4/2014 |

(Continued)

OTHER PUBLICATIONS

International Search Report dated Nov. 24, 2015, issued in counterpart International Application No. PCT/JP2015/073825 (4 pages, including annex).

(Continued)

*Primary Examiner* — Geraldina Visconti
(74) *Attorney, Agent, or Firm* — Westerman, Hattori, Daniels & Adrian, LLP

(57) ABSTRACT

An object of the present invention is to provide a composition that has positive Δε, exhibits a liquid crystal phase over a wide temperature range, has low viscosity, excellent solubility at low temperatures, and high resistivity and voltage holding ratio, and is stable against heat and light. By using this composition, IPS or TN liquid crystal display devices and the like that have excellent display quality and suppress display failures such as image-sticking and drop marks are provided in high yield.

Provided is a composition that contains at least one selected from the group consisting of compounds represented by general formulae (i) and (ii) and at least one selected from compounds represented by general formula (iii). Moreover, a liquid crystal display device using the composition and an IPS or FFS device that uses the composition are provided.

7 Claims, No Drawings

(56) References Cited

FOREIGN PATENT DOCUMENTS

| | | |
|---|---|---|
| JP | 5522314 B1 | 6/2014 |
| JP | 2015-131956 A | 7/2015 |
| WO | 2013/018796 A1 | 2/2013 |
| WO | 2014/030481 A1 | 2/2014 |
| WO | 2014/030482 A1 | 2/2014 |
| WO | 2014/034772 A1 | 3/2014 |
| WO | 2014/061365 A1 | 4/2014 |
| WO | 2014/061366 A1 | 4/2014 |

OTHER PUBLICATIONS

Office Action dated Dec. 25, 2018, issued in counterpart CN Application No. 201580049412.7, with Englsih translation (13 pages).

\* cited by examiner

COMPOSITION AND LIQUID CRYSTAL DISPLAY DEVICE USING THE SAME

TECHNICAL FIELD

The present invention relates to a composition that has positive dielectric anisotropy (Δε) useful as a liquid crystal display material, and a liquid crystal display device using the same.

BACKGROUND ART

Liquid crystal display devices are being used in watches, calculators, various measurement instruments, automobile panels, word processors, electronic organizers, printers, computers, televisions, clocks, advertising boards, etc. Representative examples of liquid crystal display modes include twisted nematic (TN) mode, super twisted nematic (STN) mode, and vertical alignment mode and in-plane-switching (IPS) mode that use thin film transistors (TFTs). The liquid crystal compositions used in these liquid crystal display devices are required to be stable against external factors such as moisture, air, heat, and light, exhibit a liquid crystal phase in a temperature range as wide as possible around room temperature, have low viscosity, and operate at low drive voltage. The liquid crystal compositions are composed of several to dozens of compounds in order to optimize dielectric anisotropy (Δε) and/or refractive index anisotropy (Δn), etc., for each individual display device.

A vertical alignment (VA) display uses a liquid crystal composition having negative Δε. A horizontal alignment display such as a TN mode, STN mode or in-plane-switching (IPS) mode display uses a liquid crystal composition having positive Δε. Also reported is a drive mode with which a liquid crystal composition with positive Δε is vertically aligned in the absence of voltage and display is conducted by applying a horizontal electric field. The need for liquid crystal compositions having positive Δε is increasing as ever. Meanwhile, low-voltage driving, high speed response, and a wide operation temperature range are required in all driving modes. In other words, positive Δε with a large absolute value, a low viscosity (η), and a high nematic phase-isotropic liquid phase transition temperature (Tni) are required. Moreover, due to setting of Δn×d, namely, the product of Δn and cell gap (d), Δn of the liquid crystal composition must be adjusted to an appropriate level according to the cell gap. In order to apply liquid crystal display devices to televisions and the like, high-speed response is important and thus a liquid crystal composition having a low rotational viscosity (γ1) is required.

As a structure of a high-speed-response-oriented liquid crystal composition, a liquid crystal composition has been disclosed in which a liquid crystal compound represented by formula (A-1) or (A-2) having positive Δε is used in combination with a liquid crystal compound (B) having neutral Δε (PTL 1 to PTL 4).

[Chem. 1]

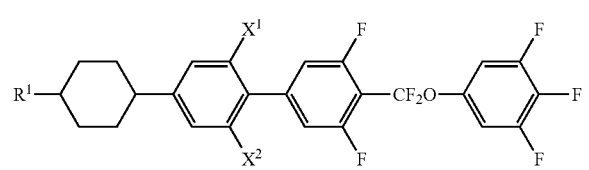
(A-1)

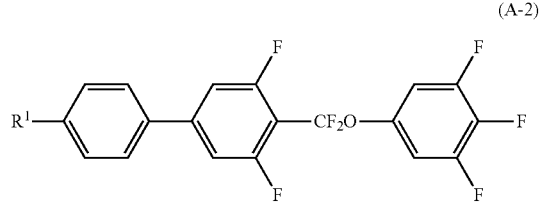
(A-2)

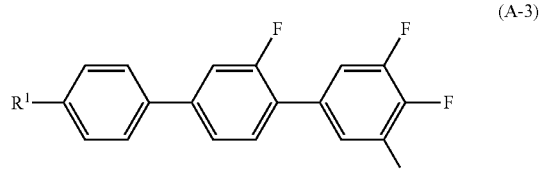
(A-3)

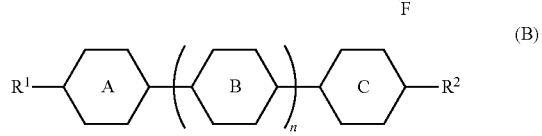
(B)

As usage of liquid crystal display devices expands, large changes have been seen in the way they are manufactured and used. In order to cope with these changes, optimization of properties other than the basic physical property values known in the art has become necessary. In other words, more VA-mode and IPS-mode liquid crystal display devices that use liquid crystal compositions are being used, and super large screen display devices of 50 or more have been introduced into the market and used. As the substrate size increases, the mainstream method for injecting a liquid crystal composition into a substrate has shifted from a conventional vacuum injection method to a one-drop-fill (ODF) method, and this causes a problem of display quality degradation caused by drop marks that occur as the liquid crystal composition is dropped onto the substrate.

Moreover, in a liquid crystal display device production process by the ODF method, the optimum amount of the liquid crystal dropped must be adjusted in accordance with the size of the liquid crystal display device. If the amount dropped significantly deviates from the optimum value, the balance between refractive index and driving electric field of the liquid crystal device preliminarily designed is no longer retained, and display failures such as nonuniformity and contrast failures occur. In particular, small-size liquid crystal display devices widely used in now prevailing smart phones involve a small optimum liquid crystal injection amount, and thus it is difficult to control deviation from the optimum value to be within a particular range. Thus, in order to achieve high yield in producing liquid crystal display devices, the liquid crystal must have properties that can resist impact and sudden pressure fluctuations within a dropping device during dropping of the liquid crystal, and be capable of being stably and continuously dropped over a long period of time.

In sum, a liquid crystal composition used in an active matrix driving liquid crystal display device driven by TFT elements and the like is required to maintain properties and performance, such as high-speed response, required by liquid crystal display devices; furthermore, there are needs for development that further improves stability against external factors such as light and heat (PTL 5 and PTL 6) and achieves high resistivity and high voltage holding ratio which have been previously considered important from the viewpoint of a production method for a liquid crystal display device.

CITATION LIST

Patent Literature

PTL 1: Japanese Unexamined Patent Application Publication No. 2008-037918
PTL 2: Japanese Unexamined Patent Application Publication No. 2008-038018
PTL 3: Japanese Unexamined Patent Application Publication No. 2010-275390
PTL 4: Japanese Unexamined Patent Application Publication No. 2011-052120
PTL 5: Japanese Unexamined Patent Application Publication No. 2006-169472
PTL 6: Japanese Unexamined Patent Application Publication No. 9-124529
PTL 7: Japanese Patent No. 5522314

SUMMARY OF INVENTION

Technical Problem

An object of the present invention is to provide a liquid crystal composition that exhibits a liquid crystal phase over a wide temperature range, has low viscosity, excellent solubility at low temperatures, and high resistivity and voltage holding ratio, is stable against heat and light, rarely causes display failures such as image-sticking and drop marks, enables high-yield production of liquid crystal display devices having excellent display quality, and has positive or negative $\Delta\varepsilon$. A liquid crystal display device that uses the liquid crystal composition is also provided.

Solution to Problem

The inventors of the present invention have studied various liquid crystal compounds and various chemical substances and found that the problem described above can be resolved by combining particular liquid crystal compounds. Thus, the present invention has been made.

Provided are a composition that contains at least one selected from the group consisting of compounds represented by general formulae (i) and (ii) and at least one selected from compounds represented by general formula (iii), a liquid crystal display device that uses the composition, and an IPS or FFS device that uses the composition.

[Chem. 2]

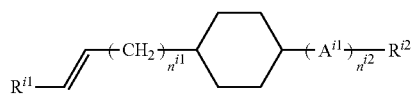
(i)

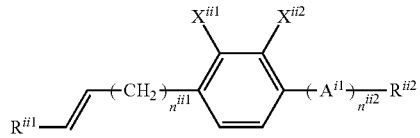
(ii)

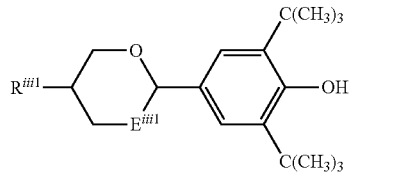
(iii)

(In the formulae, $R^{i1}$, $R^{ii1}$, and $R^{iii1}$ each independently represent a hydrogen atom or an alkyl group having 1 to 8 carbon atoms, one —$CH_2$— or two or more nonadjacent —$CH_2$— in the alkyl group may each independently be substituted with —CH=CH—, —C≡C—, —O—, —CO—, —COO—, or —OCO—, $n^{i1}$ and $n^{ii1}$ each represent an integer of 0 to 8,
$n^{i2}$ and $n^{ii2}$ each represent an integer of 1 to 4,
$A^{i1}$ and $A^{ii1}$ each independently represent a group selected from the group consisting of
(a) a 1,4-cyclohexylene group (one —$CH_2$— or two or more nonadjacent —$CH_2$— in this group may each be substituted with —O—) and
(b) a 1,4-phenylene group (one —CH= or two or more nonadjacent —CH= in this group may each be substituted with —N=),
the group (a) and the group (b) may each independently be substituted with a cyano group, a fluorine atom, or a chlorine atom but when two or more $A^{i1}$ and/or $A^{ii1}$ are present, they may be the same or different,
$E^{iii1}$ represents —O— or —$CH_2$—,
$X^{ii1}$ and $X^{ii2}$ each independently represent a hydrogen atom or a halogen, and
$R^{i2}$ and $R^{ii2}$ each independently represent an alkyl group having 1 to 8 carbon atoms and one —$CH_2$— or two or more nonadjacent —$CH_2$— in the alkyl group may each independently be substituted with —CH=CH—, —C≡C—, —O—, —CO—, —COO—, or —OCO—.)

Advantageous Effects of Invention

The liquid crystal composition having a positive or negative dielectric anisotropy according to the present invention exhibits a liquid crystal phase over a wide temperature range, has significantly low viscosity compared to the conventional technology and excellent low-temperature solubility, and undergoes little change in resistivity and voltage holding ratio under heat or light. Thus, the liquid crystal composition according to the present invention has high practical applicability (usefulness) to liquid crystal products and a liquid crystal display device such as those of IPS or FFS type that uses the liquid crystal composition can achieve high-speed response. The liquid crystal composition according to the present invention can stably exhibit its performance even after the composition has gone through the liquid crystal display device production process; thus, display failures attributable to the production process are suppressed and liquid crystal display devices can be produced in high yield. Thus, the composition is highly useful.

DESCRIPTION OF EMBODIMENTS

A composition according to the present invention preferably exhibits a liquid crystal phase at room temperature (25° C.) and more preferably exhibits a nematic phase. The composition of the present invention contains a substantially dielectrically neutral compound ($\Delta\varepsilon$ value of −2 to 2) and a compound having a positive dielectric anisotropy ($\Delta\varepsilon$ value greater than 2). The dielectric anisotropy of the compound is a value obtained by extrapolation based on the observed dielectric anisotropy of the composition prepared by adding the compound to a substantially dielectrically neutral composition at 25° C. In the description below, the content is described in % which means % by mass.

The liquid crystal composition according to the subject application contains at least one selected from the group consisting of compounds represented by general formulae (i)

and (ii) and at least one selected from compounds represented by general formula (iii). One or both of the compounds represented by general formulae (i) and (ii) may be used. When compounds represented by general formula (i) are to be used, one compound represented by general formula (i) may be used or two, three, four, or more compounds represented by general formula (i) may be used. When compounds represented by general formula (ii) are to be used, one compound represented by general formula (ii) may be used or two, three, four, or more compounds represented by general formula (ii) may be used.

In general formulae (i) and (ii), $R^{i1}$ and $R^{ii1}$ preferably each represent a hydrogen atom, an alkyl group having 1 to 8 carbon atoms, or an alkenyl group having 2 to 8 carbon atoms, preferably each represent a hydrogen atom, an alkyl group having 1 to 5 carbon atoms, or an alkenyl group having 2 to 5 carbon atoms, more preferably each represent a hydrogen atom or an alkyl group having 1 to 5 carbon atoms, and yet more preferably each represent a hydrogen atom, a methyl group, or an ethyl group.

In the formulae, $n^{i1}$ and $n^{ii1}$ preferably each represent an integer of 0 to 4 and preferably each represent 0 or 2.

[Chem. 3]

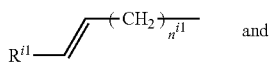

and

[Chem. 4]

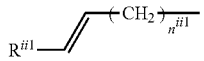

are each preferably any one of groups represented by formula (R1) to formula (R5):

[Chem. 5]

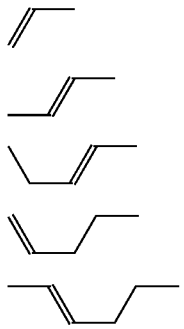

If improving viscosity, stability of the liquid crystal phase at low temperatures, and $\Delta\varepsilon$ is important, $n^{i2}$ and $n^{ii2}$ preferably each represent 1 or 2. If improving the liquid crystal phase upper limit temperature and elastic constant is important, 2, 3, or 4 is preferable. If striking a balance is important, 1 or 2 is preferable.

If $\Delta n$ needs to be high, $A^{i1}$ and $A^{ii1}$ are preferably aromatic. In order to improve response speed, aliphatic is preferable. More preferably, $A^{i1}$ and $A^{ii1}$ each independently represent any one of the following structures:

[Chem. 6]

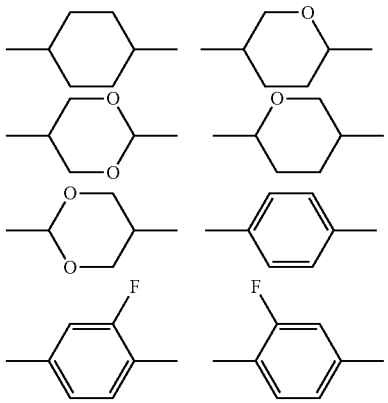

Yet more preferably, $A^{i1}$ and $A^{ii1}$ each independently represent a trans-1,4-cyclohexylene group, a 1,4-phenylene group, or a 3-fluoro-1,4-phenylene group.

Preferably, one of $X^{ii1}$ and $X^{ii2}$ represents a hydrogen atom and the other represents a fluorine atom. Alternatively, $X^{iii1}$ and $X^{ii2}$ preferably both represent a hydrogen atom.

$R^{i2}$ and $R^{ii2}$ preferably each represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably each represent an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably each represent an alkyl group having 1 to 5 carbon atoms or an alkenyl group having 2 to 5 carbon atoms, and yet more preferably each represent an alkyl group having 2 to 5 carbon atoms or an alkenyl group having 2 or 3 carbon atoms.

If reliability is important, $R^{i2}$ and $R^{ii2}$ each preferably represent an alkyl group. If decreasing the viscosity is important, an alkenyl group is preferable.

If the ring structure $R^{i2}$ and $R^{ii2}$ are bonded to is a phenyl group (aromatic), a straight-chain alkyl group having 1 to 5 carbon atoms, a straight-chain alkoxy group having 1 to 4 carbon atoms, and an alkenyl group having 4 or 5 carbon atoms are preferred. If the ring structure they are bonded to is a saturated ring structure such as cyclohexane, pyran, or dioxane, a straight-chain alkyl group having 1 to 5 carbon atoms, a straight-chain alkoxy group having 1 to 4 carbon atoms, and a straight-chain alkenyl group having 2 to 5 carbon atoms are preferred. In order to stabilize the nematic phase, the total number of carbon atoms and, if exist at all, oxygen atoms is preferably 5 or less and a straight-chain structure is preferred.

The alkenyl group is preferably selected from the groups represented by formula (R1) to formula (R5) (the black dot in each formula represents a carbon atom in the ring structure).

[Chem. 7]

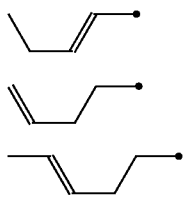

(R3)

(R4)

(R5)

One, two, three, or four or more compounds represented by general formula (iii) may be used.

In general formula (iii), $R^{iii1}$ preferably represents an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably represents an alkyl group having 1 to 5 carbon atoms or an alkenyl group having 2 to 5 carbon atoms, yet more preferably represents an alkyl group having 2 to 5 carbon atoms or an alkenyl group having 2 or 3 carbon atoms, and most preferably represents an alkyl group having 2 to 5 carbon atoms.

The composition according to the present invention contains at least one selected from the group consisting of compounds represented by general formulae (i) and (ii). As the compounds represented by general formula (i), compounds represented by general formulae (i-1) to (i-3) below are preferable. As the compounds represented by general formula (ii), compounds represented by general formulae (ii-1) and (ii-2) below are preferable.

The compound represented by general formula (i-1) is the following compound.

[Chem. 8]

(i-1)

(In the formula, $R^{i11}$, $R^{i12}$, and $n^{i11}$ are the same as $R^{i1}$, $R^{i2}$, and $n^{i1}$ in general formula (i).)

The compound represented by general formula (i-1) is preferably a compound selected from the group consisting of compounds represented by general formula (i-1-1).

[Chem. 9]

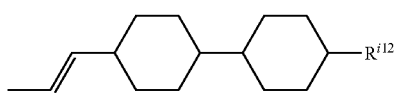

(i-1-1)

(In the formula, $R^{i12}$ is the same as that in general formula (i-1).)

The preferable lower limit of the content of the compound represented by formula (i-1-1) relative to the total amount of the composition of the present invention is 1%, 2%, 3%, 5%, 7%, or 10%. The preferable upper limit of the content relative to the total amount of the composition of the present invention is 20%, 15%, 13%, 10%, 8%, 7%, 6%, 5%, or 3%.

The compound represented by general formula (i-1-1) is preferably a compound selected from the group consisting of compounds represented by formula (i-1-1.1) to formula (i-1-1.3), preferably a compound represented by formula (i-1-1.2) or formula (i-1-1.3), and particularly preferably a compound represented by formula (i-1-1.3).

[Chem. 10]

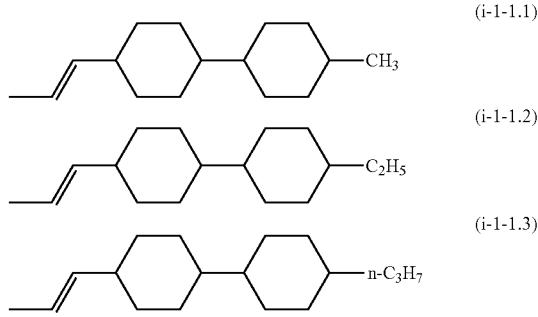

The preferable lower limit of the content of the compound represented by formula (i-1-1.3) relative to the total amount of the composition of the present invention is 1%, 2%, 3%, 5%, 7%, or 10%. The preferable upper limit of the content relative to the total amount of the composition of the present invention is 20%, 15%, 13%, 10%, 8%, 7%, 6%, 5%, or 3%.

The compound represented by general formula (i-1) is preferably a compound selected from the group consisting of compounds represented by general formula (i-1-2).

[Chem. 11]

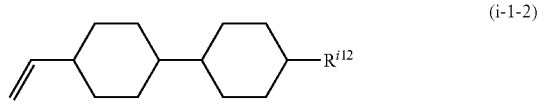

(i-1-2)

(In the formula, $R^{i12}$ is the same as that in general formula (i-1).)

The preferable lower limit of the content of the compound represented by formula (i-1-2) relative to the total amount of the composition of the present invention is 1%, 5%, 10%, 15%, 17%, 20%, 23%, 25%, 27%, 30%, or 35%. The preferable upper limit of the content relative to the total amount of the composition of the present invention is 60%, 55%, 50%, 45%, 42%, 40%, 38%, 35%, 33%, or 30%.

The compound represented by general formula (i-1-2) is preferably a compound selected from the group consisting of compounds represented by formula (i-1-2.1) to formula (i-1-2.4) and preferably a compound represented by any one of formula (i-1-2.2) to formula (i-1-2.4). In particular, the compound represented by formula (i-1-2.2) is preferable since it particularly improves the response speed of the composition of the present invention. If high Tni is desirable rather than the response speed, the compound represented by formula (i-1-2.3), or formula (i-1-2.4) is preferably used. The content of the compounds represented by formula (i-1-2.3) and formula (i-1-2.4) is preferably less than 30% in order to improve the low temperature solubility.

[Chem. 12]

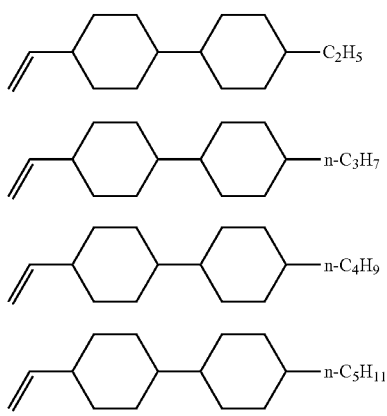

(i-1-2.1)
(i-1-2.2)
(i-1-2.3)
(i-1-2.4)

The preferable lower limit of the content of the compound represented by formula (i-1-2.2) relative to the total amount of the composition of the present invention is 10%, 15%, 18%, 20%, 23%, 25%, 27%, 30%, 33%, 35%, 38%, or 40%. The preferable upper limit of the content relative to the total amount of the composition of the present invention is 60%, 55%, 50%, 45%, 43%, 40%, 38%, 35%, 32%, 30%, 27%, 25%, or 22%.

The preferable lower limit of the total of the compound represented by formula (i-1-1.3) and the compound represented by formula (i-1-2.2) used in combination relative to the total amount of the composition of the present invention is 10%, 15%, 20%, 25%, 27%, 30%, 35%, or 40%. The preferable upper limit of the content relative to the total amount of the composition of the present invention is 60%, 55%, 50%, 45%, 43%, 40%, 38%, 35%, 32%, 30%, 27%, 25%, or 22%.

The compound represented by general formula (i-1) is preferably a compound selected from the group consisting of compounds represented by general formula (i-1-4) and (i-1-5).

[Chem. 13]

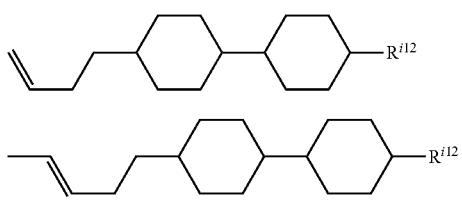

(i-1-4)
(i-1-5)

(In the formula, $R^{i12}$ is the same as that in general formula (i-1).)

The preferable lower limit of the content of the compound represented by formula (i-1-4) relative to the total amount of the composition of the present invention is 1%, 5%, 10%, 13%, 15%, 17%, or 20%. The preferable upper limit of the content relative to the total amount of the composition of the present invention is 25%, 23%, 20%, 17%, 15%, 13%, or 10%.

The preferable lower limit of the content of the compound represented by formula (i-1-5) relative to the total amount of the composition of the present invention is 1%, 5%, 10%, 13%, 15%, 17%, or 20%. The preferable upper limit of the content relative to the total amount of the composition of the present invention is 25%, 23%, 20%, 17%, 15%, 13%, or 10%.

The compounds represented by general formulae (i-1-4) and (i-1-5) are preferably compounds selected from the group consisting of compounds represented by formula (i-1-4.1) to formula (i-1-5.3). A compound represented by formula (i-1-4.2) or formula (i-1-5.2) is also preferable.

[Chem. 14]

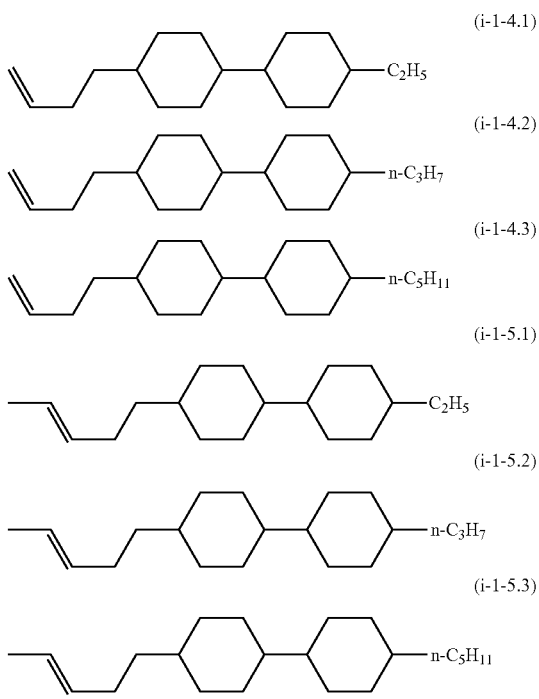

(i-1-4.1)
(i-1-4.2)
(i-1-4.3)
(i-1-5.1)
(i-1-5.2)
(i-1-5.3)

The preferable lower limit of the content of the compound represented by formula (i-1-4.2) relative to the total amount of the composition of the present invention is 1%, 2%, 3%, 5%, 7%, 10%, 13%, 15%, 18%, or 20%. The preferable upper limit of the content relative to the total amount of the composition of the present invention is 20%, 17%, 15%, 13%, 10%, 8%, 7%, or 6%.

Preferably, two or more compounds selected from compounds represented by formula (i-1-1.3), formula (i-1-2.2), formula (i-1-3.1), formula (i-1-3.3), formula (i-1-3.4), formula (i-1-3.11), and formula (i-1-3.12) are used in combination. Preferably, two or more compounds selected from compounds represented by formula (i-1-1.3), formula (i-1-2.2), formula (i-1-3.1), formula (i-1-3.3), formula (i-1-3.4), and formula (i-1-4.2) are used in combination. The preferable lower limit of the total content of these compounds relative to the total amount of the composition of the present invention is 1%, 2%, 3%, 5%, 7%, 10%, 13%, 15%, 18%, 20%, 23%, 25%, 27%, 30%, 33%, or 35%. The upper limit relative to the total amount of the composition of the present invention is 80%, 70%, 60%, 50%, 45%, 40%, 37%, 35%, 33%, 30%, 28%, 25%, 23%, or 20%. If reliability of the composition is important, two or more compounds selected from compounds represented by formula (i-1-3.1), formula (i-1-3.3), and formula (i-1-3.4)) are preferably used in combination. If response speed of the composition is important, two or more compounds selected from compounds represented by formula (i-1-1.3) and formula (i-1-2.2) are preferably used in combination.

The compound represented by general formula (i-2) is the following compound.

[Chem. 15]

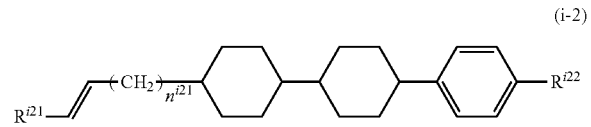

(i-2)

(In the formula, $R^{i21}$, $R^{i22}$, and $n^{i21}$ are the same as $R^{i1}$, $R^{i2}$, and $n^{i1}$ in general formula (i).)

$R^{i21}$ preferably represents an alkyl group having 1 to 5 carbon atoms or an alkenyl group having 2 to 5 carbon atoms and $R^{i22}$ preferably represents an alkyl group having 1 to 5 carbon atoms, an alkenyl group having 4 or 5 carbon atoms, or an alkoxy group having 1 to 4 carbon atoms.

The compounds represented by general formula (i-2) can be used alone or in combination of two or more compounds. The number of compounds that can be used in combination is not particularly limited and is selected in accordance with the desired properties such as low-temperature solubility, transition temperature, electrical reliability, and birefringence. The number of compounds used is, for example, 1, 2, 3, 4, or 5 or more in one embodiment of the present invention.

In the composition of the present invention, the content of the compound represented by general formula (i-2) must be appropriately adjusted in accordance with the desired properties, such as low-temperature solubility, transition temperature, electrical reliability, birefringence, process compatibility, drop marks, image-sticking, and dielectric anisotropy.

The preferable lower limit of the content of the compound represented by formula (i-2) relative to the total amount of the composition of the present invention is 1%, 2%, 3%, 5%, 7%, 10%, 14%, 16%, 20%, 23%, 26%, 30%, 35%, or 40%. The preferable upper limit of the content of the compound represented by formula (i-2) relative to the total amount of the composition of the present invention is 50%, 40%, 35%, 30%, 20%, 15%, 10%, or 5%.

The compounds represented by general formula (i-2) are preferably compounds represented by formula (i-2.1) to formula (i-2.3), for example.

[Chem. 16]

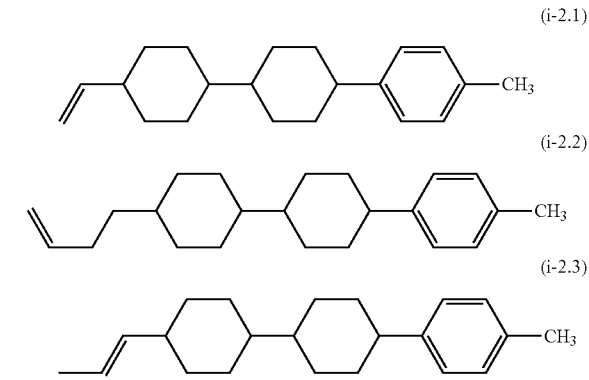

(i-2.1)

(i-2.2)

(i-2.3)

In accordance with the desired properties, such as low-temperature solubility, transition temperature, electrical reliability, and birefringence, the compound represented by formula (i-2.1) may be contained, the compound represented by formula (i-2.2) may be contained, the compound represented by formula (i-2.1) and the compound represented by (i-2.2) may both be contained, or the compounds represented by formula (i-2.1) to formula (i-2.3) may all be contained. The preferable lower limit of the content of the compound represented by formula (i-2.1) or formula (i-2.2) relative to the total amount of the composition of the present invention is 3%, 5%, 7%, 9%, 11%, 12%, 13%, 18%, or 21%. The preferable upper limit is 45, 40%, 35%, 30%, 25%, 23%, 20%, 18%, 15%, 13%, 10%, or 8%.

When the compound represented by formula (i-2.1) and the compound represented by formula (i-2.2) are both contained, the preferable lower limit of the content of the two compounds relative to the total amount of the composition of the present invention is 15%, 19%, 24%, or 30%. The preferable upper limit is 45, 40%, 35%, 30%, 25%, 23%, 20%, 18%, 15%, or 13%.

The compound represented by general formula (i-3) is the following compound.

[Chem. 17]

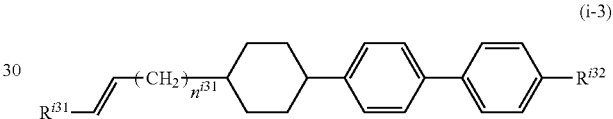

(i-3)

(In the formula, $R^{i31}$, $R^{i32}$, and $n^{i31}$ are the same as $R^{i1}$, $R^{i2}$, and $n^{i1}$ in general formula (i).)

$R^{i31}$ preferably represents an alkyl group having 1 to 5 carbon atoms or an alkenyl group having 2 to 5 carbon atoms. $R^{i32}$ preferably represents an alkyl group having 1 to 5 carbon atoms, an alkenyl group having 4 or 5 carbon atoms, or an alkoxy group having 1 to 4 carbon atoms.

The compounds represented by general formula (i-3) can be used alone or in combination of two or more compounds. The number of compounds that can be used in combination is not particularly limited and is selected in accordance with the desired properties such as low-temperature solubility, transition temperature, electrical reliability, and birefringence. The number of compounds used is, for example, 1, 2, 3, 4, or 5 or more in one embodiment of the present invention.

In the composition of the present invention, the content of the compound represented by general formula (i-3) must be appropriately adjusted in accordance with the desired properties, such as low-temperature solubility, transition temperature, electrical reliability, birefringence, process compatibility, drop marks, image-sticking, and dielectric anisotropy.

The preferable lower limit of the content of the compound represented by formula (i-3) relative to the total amount of the composition of the present invention is 1%, 2%, 3%, 5%, 7%, 10%, 14%, 16%, 20%, 23%, 26%, 30%, 35%, or 40%. The preferable upper limit of the content of the compound represented by formula (L-5) relative to the total amount of the composition of the present invention is 50%, 40%, 35%, 30%, 20%, 15%, 10%, or 5%.

The compound represented by general formula (i-3) is preferably a compound represented by formula (i-3.1) or formula (i-3.2).

The preferable lower limit of the content of these compounds relative to the total amount of the composition of the present invention is 1%, 2%, 3%, 5%, or 7%. The preferable upper limit of the content of these compounds is 20%, 15%, 13%, 10%, or 9%.

[Chem. 18]

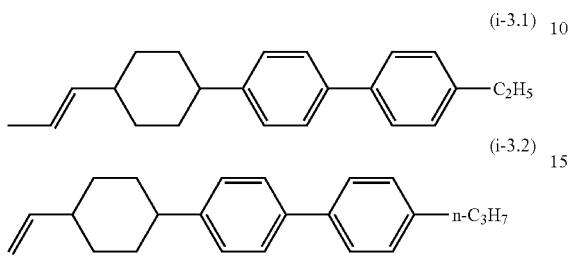

The compound represented by general formula (ii-1) is the following compound.

[Chem. 19]

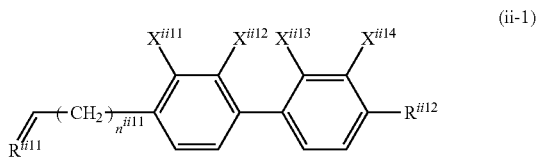

(In the formula, $R^{ii11}$, $R^{ii12}$, $n^{ii11}$, $X^{ii11}$, and $X^{ii12}$ are the same as $R^{ii1}$, $R^{ii2}$, $n^{ii1}$, $X^{ii1}$, and $X^{ii2}$ in general formula (ii) and $X^{ii13}$ and $X^{ii14}$ each independently represent a hydrogen atom or a fluorine atom.)

$R^{ii21}$ and $R^{ii22}$ preferably each independently represent an alkyl group having 1 to 5 carbon atoms or an alkenyl group having 2 to 5 carbon atoms.

$X^{ii11}$ to $X^{ii14}$ preferably all represent a hydrogen atom or all represent a hydrogen atom except for one that represents a fluorine atom.

The compounds represented by general formula (ii-1) can be used alone or in combination of two or more compounds. The number of compounds that can be used in combination is not particularly limited and is selected in accordance with the desired properties such as low-temperature solubility, transition temperature, electrical reliability, and birefringence. The number of compounds used is, for example, 1, 2, 3, 4, or 5 or more in one embodiment of the present invention.

The preferable lower limit of the content of the compound represented by formula (ii-1) relative to the total amount of the composition of the present invention is 1%, 2%, 3%, 5%, 7%, 10%, 14%, 16%, 20%, 23%, 26%, 30%, 35%, or 40%. The preferable upper limit of the compound represented by formula (ii-1) relative to the total amount of the composition of the present invention is 50%, 40%, 35%, 30%, 20%, 15%, 10%, or 5%. If increasing Δn is important, the content is preferably large. If precipitation at low temperature is important, the content is preferably small.

The compounds represented by general formula (ii-1) are preferably compounds represented by formula (ii-1.10) to formula (ii-1.15), for example. Among these, a compound represented by formula (ii-1.13) is preferable.

[Chem. 20]

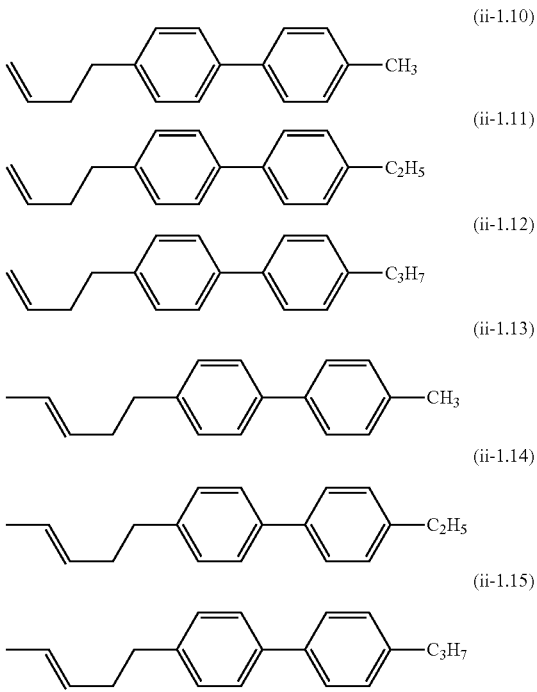

The preferable lower limit of the content of these compounds relative to the total amount of the composition of the present invention is 1%, 2%, 3%, 5%, or 7%. The preferable upper limit of the content of these compounds is 20%, 15%, 13%, 10%, or 9%.

The compound represented by general formula (ii-2) is the following compound.

[Chem. 21]

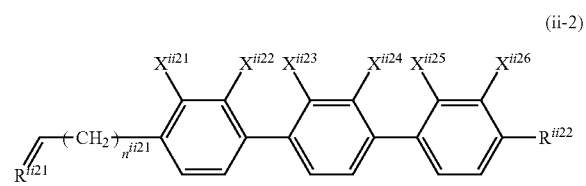

(In the formula, $R^{ii21}$, $R^{ii22}$, $n^{ii21}$, $X^{ii21}$, and $X^{ii22}$ are the e same as $R^{ii1}$, $R^{ii2}$, $n^{ii1}$, $X^{ii1}$, and $X^{ii2}$ in general formula (ii) and $X^{ii23}$, $X^{ii24}$, $X^{ii25}$, and $X^{ii26}$ each independently represent a hydrogen atom or a fluorine atom.)

$R^{ii21}$ and $R^{ii22}$ preferably each independently represent an alkyl group having 1 to 5 carbon atoms or an alkenyl group having 2 to 5 carbon atoms.

$X^{ii21}$ to $X^{ii26}$ preferably all represent a hydrogen atom or all represent a hydrogen atom except one that represents a fluorine atom. Preferably, one of $X^{ii23}$ and $X^{ii24}$ represents a fluorine atom and all others represent a hydrogen atom.

The compounds represented by general formula (ii-2) can be used alone or in combination of two or more compounds. The number of compounds that can be used in combination is not particularly limited and is selected in accordance with the desired properties such as low-temperature solubility, transition temperature, electrical reliability, and birefringence. The number of compounds used is, for example, 1, 2, 3, 4, or 5 or more in one embodiment of the present invention.

The preferable lower limit of the content of the compound represented by formula (ii-2) relative to the total amount of the composition of the present invention is 1%, 2%, 3%, 5%, 7%, 10%, 14%, 16%, 20%, 23%, 26%, 30%, 35%, or 40%. The preferable upper limit of the content of the compound represented by formula (ii-2) relative to the total amount of the composition of the present invention is 50%, 40%, 35%, 30%, 20%, 15%, 10%, or 5%. If increasing Δn is important, the content is preferably large. If precipitation at low temperature is important, the content is preferably small.

The compounds represented by general formula (ii-2) are preferably compounds represented by formula (ii-2.10) to formula (ii-2.17), for example. Among these, a compound represented by formula (ii-2.11) is preferable.

[Chem. 22]

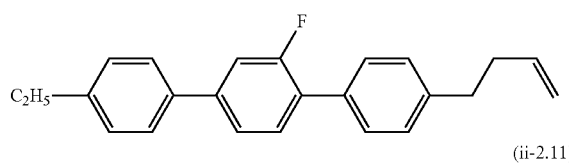
(ii-2.10)

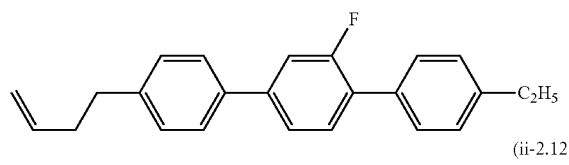
(ii-2.11)

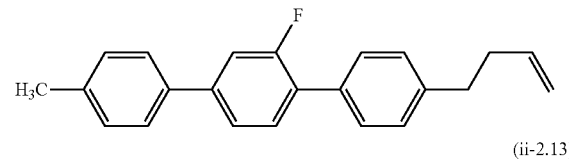
(ii-2.12)

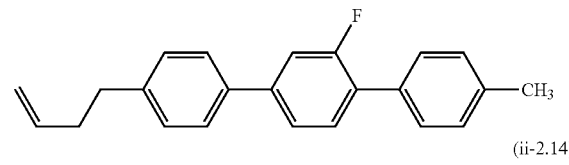
(ii-2.13)

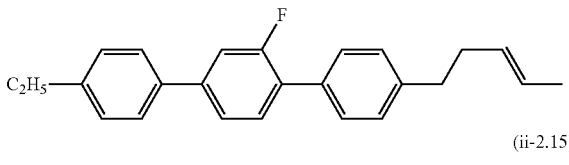
(ii-2.14)

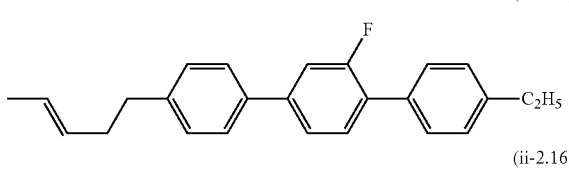
(ii-2.15)

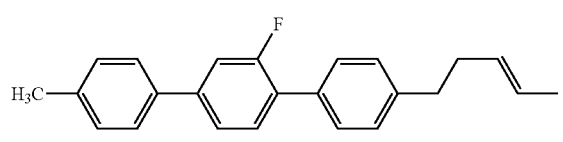
(ii-2.16)

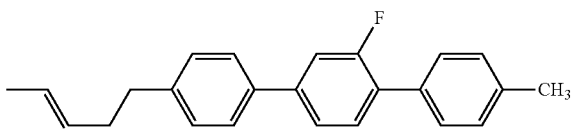
(ii-2.17)

The preferable lower limit of the content of these compounds relative to the total amount of the composition of the present invention is 1%, 2%, 3%, 5%, or 7%. The preferable upper limit of the content of these compounds is 20%, 15%, 13%, 10%, or 9%.

When the compounds represented by general formula (i) and (ii) are used in combination, the preferable lower limit of the total content relative to the total amount of the composition of the present invention is 1%, 2%, 3%, 5%, 7%, 10%, 14%, 16%, 20%, 23%, 26%, 30%, 35%, or 40%. The preferable upper limit of the total content relative to the total amount of the composition of the present invention is 70%, 65%, 60%, 55%, 53%, 50%, 48%, 45%, 43%, 40%, 38%, 35%, 33%, 30%, 20%, 15%, 10%, or 5%.

The composition of the present invention contains at least one compound represented by general formula (iii). The compounds represented by general formula (iii) are preferably compounds represented by general formula (iii-1) and (iii-2) below.

[Chem. 23]

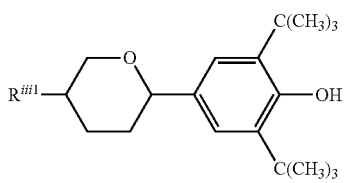
(iii-1)

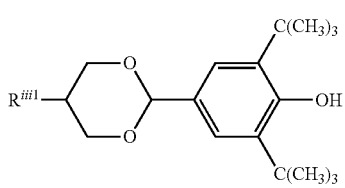
(iii-2)

(In the formulae, $R^{iii1}$ represents an alkyl group having 1 to 8 carbon atoms and one —CH$_2$— or two or more nonadjacent —CH$_2$— in the alkyl group may each independently be substituted with —CH═CH—, —C≡C—, —O—, —CO—, —COO—, or —OCO—.)

There are no limits on compounds that can be used in combination, but one or more compounds are preferably used in combination by considering low-temperature solubility, transition temperature, electrical reliability, birefringence, etc.

The content of the compound represented by general formula (iii) has an upper limit and a lower limit for each embodiment considering properties such as low-temperature solubility, transition temperature, electrical reliability, and birefringence.

The preferable lower limit of the content of the compound represented by formula (iii) relative to the total amount of the composition of the present invention is 0.001%, 0.005%, 0.01%, or 0.02%. The preferable upper limit of the content is 0.1%, 0.08%, or 0.05%.

The compounds represented by general formula (iii) used in the composition of the present invention are preferably compounds represented by formula (iii-1.1) to formula (iii-1.14) below, specifically. Among these, compounds represented by formula (iii-1.2) and formula (iii-2.2) are preferably contained and the compound represented by formula (iii-2.2) is preferably contained.

[Chem. 24]

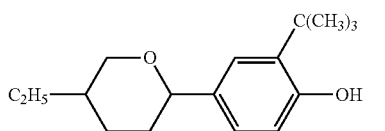
(iii-1.1)

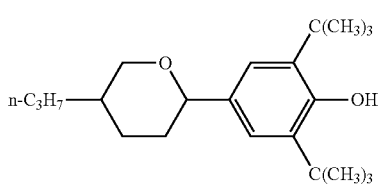
(iii-1.2)

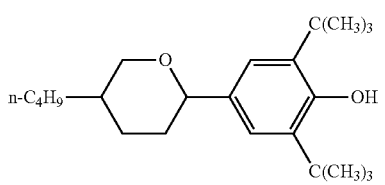
(iii-1.3)

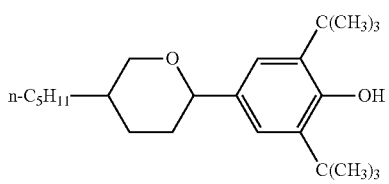
(iii-1.4)

[Chem. 25]

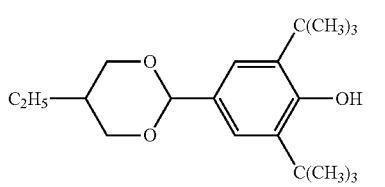
(iii-2.1)

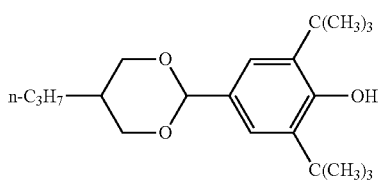
(iii-2.2)

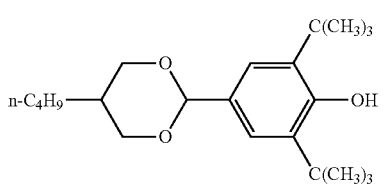
(iii-2.3)

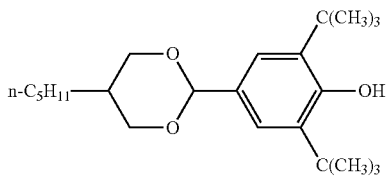
(iii-2.4)

The preferable lower limit of the content of the compound represented by formula (iii-1.2) relative to the total amount of the composition of the present invention is 0.001%, 0.005%, 0.01%, or 0.02%. The preferable upper limit of the content is 0.1%, 0.08%, or 0.05%.

The preferable lower limit of the content of the compound represented by formula (iii-2.2) relative to the total amount of the composition of the present invention is 0.001%, 0.005%, 0.01%, or 0.02%. The preferable upper limit of the content is 0.1%, 0.08%, or 0.05%.

The composition of the present invention preferably contains at least one compound represented by general formula (M). These compounds correspond to dielectrically positive compounds ($\Delta\varepsilon$ is greater than 2).

[Chem. 26]

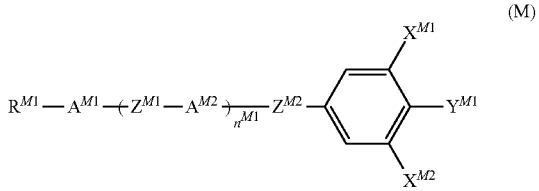
(M)

(In the formula, $R^{M1}$ represents an alkyl group having 1 to 8 carbon atoms, one —$CH_2$— or two or more nonadjacent —$CH_2$— in the alkyl group may each independently be substituted with —CH=CH—, —C≡C—, —O—, —CO—, —COO—, or —OCO—, $n^{M1}$ represents 0, 1, 2, 3, or 4, $A^{M1}$ and $A^{M2}$ each independently represent a group selected from the group consisting of (a) a 1,4-cyclohexylene group (one —$CH_2$— or two or more nonadjacent —$CH_2$— in this group may each be substituted with —O— or —S—) and (b) a 1,4-phenylene group (one —CH= or two or more nonadjacent —CH= in this group may each be substituted with —N=), hydrogen atoms in the group (a) and the group (b) may each independently be substituted with a cyano group, a fluorine atom, or a chlorine atom, $Z^{M1}$ and $Z^{M2}$ each independently represent a single bond, —$CH_2CH_2$—, —$(CH_2)_4$—, —$OCH_2$—, —$CH_2O$—, —$OCF_2$—, —$CF_2O$—, —COO—, —OCO—, or —C≡C—, when $n^{M1}$ represents 2, 3, or 4 and two or more $A^{M1}$ are present, they may be the same or different; when $n^{M1}$ represents 2, 3, or 4 and two or more $Z^{M2}$ are present, they may be the same or different, $X^{M1}$ and $X^{M2}$ each independently represent a hydrogen atom, a chlorine atom, or a fluorine atom, and $Y^{M1}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group but compounds represented by general formula (i) and (ii) are excluded.)

In general formula (M), $R^{M1}$ preferably represents an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, preferably represents an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, more preferably represents an alkyl group having 1 to 5 carbon atoms or an alkenyl group having 2 to 5 carbon atoms, yet more preferably represents an alkyl group having 2 to 5 carbon atoms or an alkenyl group having 2 or 3 carbon atoms, and most preferably represents an alkenyl group having 3 carbon atoms (propenyl group).

If reliability is important, $R^{M1}$ preferably represents an alkyl group. If decreasing viscosity is important, an alkenyl group is preferable.

If the ring structure it is bonded to is a phenyl group (aromatic), a straight-chain alkyl group having 1 to 5 carbon atoms, a straight-chain alkoxy group having 1 to 4 carbon atoms, and an alkenyl group having 4 or 5 carbon atoms are preferable. If the ring structure it is bonded to is a saturated ring structure such as cyclohexane, pyran, and dioxane, a straight-chain alkyl group having 1 to 5 carbon atoms, a straight-chain alkoxy group having 1 to 4 carbon atoms, and a straight-chain alkenyl group having 2 to 5 carbon atoms are preferable. In order to stabilize the nematic phase, the total number of carbon atoms and oxygen atoms if exist at all is preferably 5 or less and a straight-chain structure is preferred.

The alkenyl group is preferably selected from the groups represented by formula (R1) to formula (R5) (the black dot in each formula represents a carbon atom in the ring structure).

[Chem. 27]

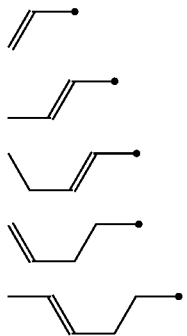

(R1)

(R2)

(R3)

(R4)

(R5)

If improving viscosity, stability of the liquid crystal phase at low temperature, and Δε is important, $n^{M1}$ preferably represents 0 or 1. If improving the liquid crystal phase upper limit temperature and elastic constant is important, 1, 2, or 3 is preferable. If striking the balance is important, 1 or 2 is preferable.

If Δn needs to be increased, $A^{M1}$ and $A^{M2}$ are preferably both aromatic. In order to improve response speed, they are preferably each independently aliphatic. $A^{M1}$ and $A^{M2}$ more preferably each represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group. They yet more preferably each represent any one of the following structures.

[Chem. 28]

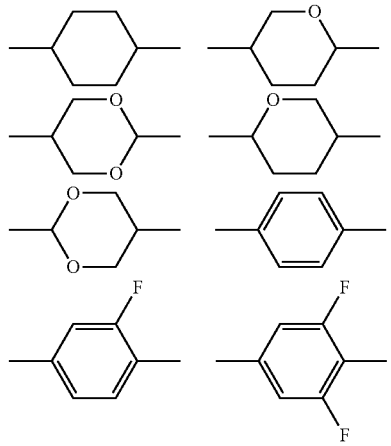

The following structures are yet more preferable.

[Chem. 29]

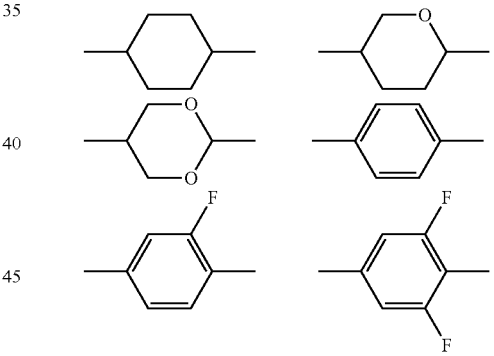

$Z^{M1}$ and $Z^{M2}$ preferably each independently represent —CH$_4$O—, —CF$_2$O—, —CH$_2$CH$_2$—, —CF$_2$CF$_2$—, or a single bond, more preferably each independently represent —CF$_2$O—, —CH$_2$CH$_2$—, or a single bond, and yet more preferably each independently represent —CF$_2$O— or a single bond.

Preferably, one of $X^{M1}$ and $X^{M2}$ represents a hydrogen atom while the other represents a fluorine atom. Preferably, both represent a fluorine atom.

$Y^{M1}$ preferably represents a fluorine atom, a cyano group, a trifluoromethyl group, or a trifluoromethoxy group. For TFTs, a fluorine atom, a trifluoromethyl group, and a trifluoromethoxy group are preferable and a fluorine atom and a trifluoromethoxy group are more preferable.

The number of compounds that can be used in combination is not particularly limited and is selected in accordance with the desired properties such as low-temperature solubility, transition temperature, electrical reliability, and birefringence. The number of compounds used is, for example, 1, 2, or 3 in one embodiment of the present invention, or 4, 5, 6, 7, or more in other embodiments of the present invention.

In the composition of the present invention, the content of the compound represented by general formula (M) must be appropriately adjusted in accordance with the desired properties, such as low-temperature solubility, transition temperature, electrical reliability, birefringence, process compatibility, drop marks, image-sticking, and dielectric anisotropy.

The preferable lower limit of the content of the compound represented by formula (M) relative to the total amount of the composition of the present invention is 1%, 10%, 20%, 30%, 40%, 50%, 55%, 60%, 65%, 70%, 75%, or 80%. The preferable upper limit of the content relative to the total amount of the composition of the present invention, is, for example, 95%, 85%, 75%, 65%, 55%, 45%, 35%, or 25% in one embodiment of the present invention.

If the composition of the present invention is to maintain low viscosity and have high response speed, the lower limit is preferably relatively low and the upper limit is preferably relatively low. If the composition of the present invention is to maintain high Tni and have excellent temperature stability, the lower limit is preferably relatively low and the upper limit is preferably relatively low. In order to increase dielectric anisotropy to keep low driving voltage, the lower limit is preferably relatively high and the upper limit is preferably relatively high.

If reliability is important, $R^{M1}$ preferably represents an alkyl group. If decreasing viscosity is important, an alkenyl group is preferable.

The compound represented by general formula (M) is preferably a compound selected from the group consisting f compounds represented by general formulae (M-1) to (M-8).

The compound represented by general formula (M-1) is the following compound.

[Chem. 30]

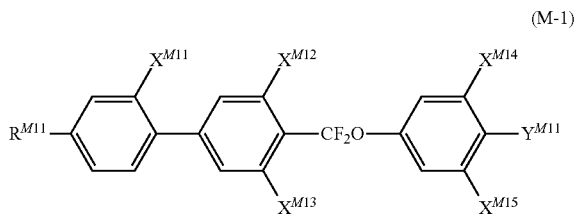

(M-1)

(In the formula, $R^{M11}$ represents an alkyl group having 1 to 5 carbon atoms, an alkenyl group having 2 to 5 carbon atoms, or an alkoxy group having 1 to 4 carbon atoms, $X^{M11}$ to $X^{M15}$ each independently represent a hydrogen atom or a fluorine atom, and $Y^{M11}$ represents a fluorine atom or $OCF_3$.)

The number of compounds that can be used in combination is not particularly limited and is selected in accordance with the desired properties such as low-temperature solubility, transition temperature, electrical reliability, and birefringence. The number of compounds used is, for example, 1, 2, or 3 or more in one embodiment of the present invention.

The preferable lower limit of the content of the compound represented by formula (M-1) relative to the total amount of the composition of the present invention is 1%, 2%, 5%, 8%, 10%, 13%, 15%, 18%, 20%, 22%, 25%, or 30%. The preferable upper limit of the content is 30%, 28%, 25%, 23%, 20%, 18%, 15%, 13%, 10%, 8%, or 5%.

If the composition of the present invention is to maintain low viscosity and have high response speed, the lower limit is preferably relatively low and the upper limit is preferably relatively low. If the composition of the present invention is to maintain Tni and have excellent temperature stability, the lower limit is preferably relatively low and the upper limit is preferably relatively low. In order to increase dielectric anisotropy to keep driving voltage low, the lower limit is preferably relatively high and the upper limit is preferably relatively high.

The compounds represented by general formula (M-1) are specifically preferably compounds represented by formula (M-1.1) to formula (M-1.4), preferably a compounds represented by formula (M-1.1) or formula (M-1.2), and more preferably a compound represented by formula (M-1.2). Alternatively, compounds represented by formula (M-1.1) or formula (M-1.2) may be simultaneously used.

[Chem. 31]

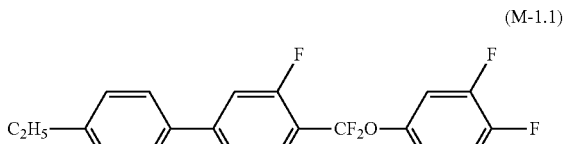

(M-1.1)

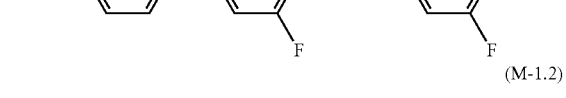

(M-1.2)

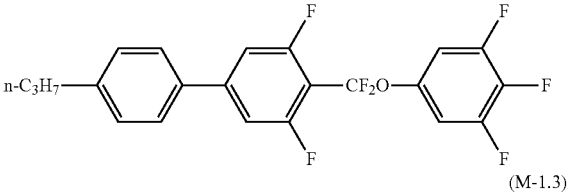

(M-1.3)

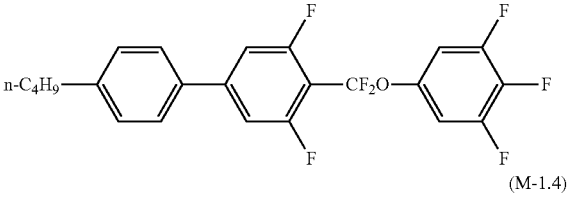

(M-1.4)

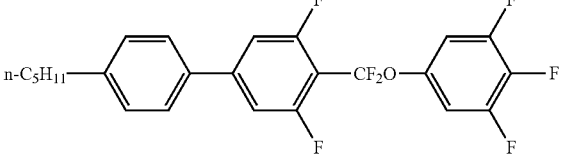

The preferable lower limit of the content of the compound represented by formula (M-1.1) relative to the total amount of the composition of the present invention is 1%, 2%, 5%, or 6%. The preferable upper limit of the content is 15%, 13%, 10%, 8%, or 5%.

The preferable lower limit of the content of the compound represented by formula (M-1.2) relative to the total amount of the composition of the present invention is 1%, 2%, 5%, or 6%. The preferable upper limit of the content is 30%, 25%, 23%, 20%, 18%, 15%, 13%, 10%, or 8%.

The preferable lower limit of the total content of the compounds represented by formula (M-1.1) and formula (M-1.2) relative to the total amount of the composition of the present invention is 1%, 2%, 5%, or 6%. The preferable upper limit of the content is 30%, 25%, 23%, 20%, 18%, 15%, 13%, 10%, or 8%.

The compound represented by general formula (M-2) is the following compound.

[Chem. 32]

(M-2)

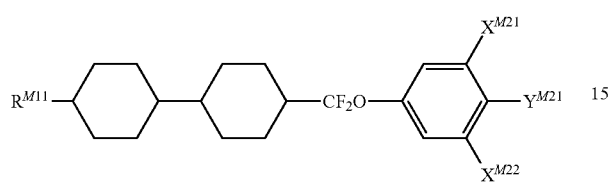

(In the formula, $R^{M21}$ represents an alkyl group having 1 to 5 carbon atoms, an alkenyl group having 2 to 5 carbon atoms, or an alkoxy group having 1 to 4 carbon atoms, $X^{M21}$ and $X^{M22}$ each independently represent a hydrogen atom or a fluorine atom, and $Y^{M21}$ represents a fluorine atom, a chlorine atom, or $OCF_3$.)

The preferable lower limit of the content of the compound represented by formula (M-1) relative to the total amount of the composition of the present invention is 1%, 2%, 5%, 8%, 10%, 13%, 15%, 18%, 20%, 22%, 25%, and 30%. The preferable upper limit of the content is 30%, 28%, 25%, 23%, 20%, 18%, 15%, 13%, 10%, 8%, or 5%.

If the composition of the present invention is to maintain low viscosity and have high response speed, the lower limit is preferably relatively low and the upper limit is preferably relatively low. If the composition of the present invention is to maintain high Tni and have less image-sticking, the lower limit is preferably relatively low and the upper limit is preferably relatively low. In order to increase dielectric anisotropy to keep driving voltage low, the lower limit is preferably relatively high and the upper limit is preferably relatively high.

The compounds represented by general formula (M-2) are preferably compounds represented by formula (M-2.1) to formula (M-2.5), and are preferably compounds represented by formula (M-2.3) and/or formula (M-2.5).

[Chem. 33]

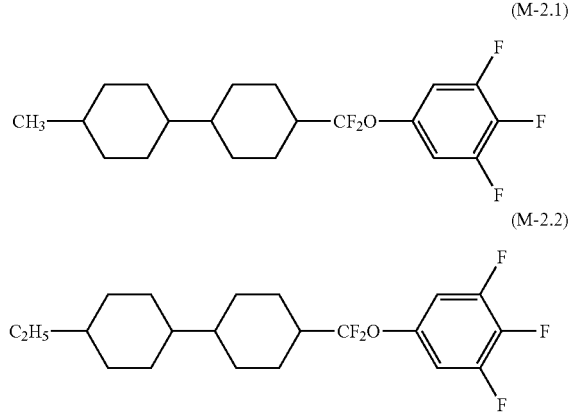

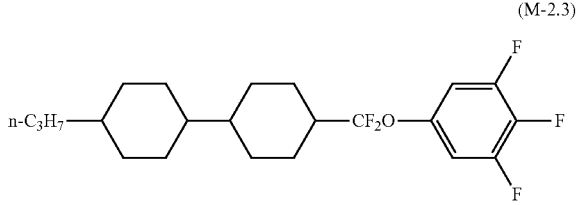

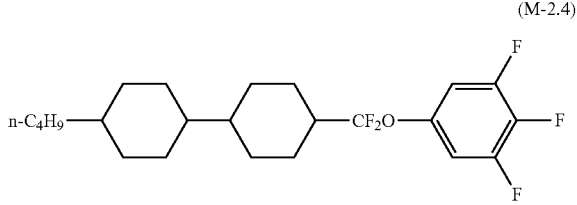

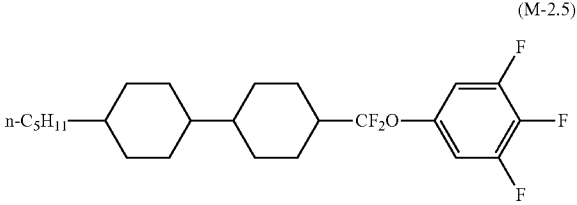

The preferable lower limit of the content of the compound represented by formula (M-2.2) relative to the total amount of the composition of the present invention is 1%, 2%, 5%, or 6%. The preferable upper limit of the content is 15%, 13%, 10%, 8%, or 5%.

The preferable lower limit of the content of the compound represented by formula (M-2.3) relative to the total amount of the composition of the present invention is 1%, 2%, 5%, or 6%. The preferable upper limit of the content is 30%, 25%, 23%, 20%, 18%, 15%, 13%, 10%, or 8%.

The preferable lower limit of the content of the compound represented by formula (M-2.5) relative to the total amount of the composition of the present invention is 1%, 2%, 5%, or 6%. The preferable upper limit of the content is 30%, 25%, 23%, 20%, 18%, 15%, 13%, 10%, or 8%.

The preferable lower limit of the total content of the compounds represented by formula (M-2.2), formula (M-2.3), and formula (M-2.5) relative to the total amount of the composition of the present invention is 1%, 2%, 5%, or 6%. The preferable upper limit of the content is 30%, 25%, 23%, 20%, 18%, 15%, 13%, 10%, or 8%.

The content relative to the total amount of the composition of the present invention is preferably 1% or more, more preferably 5% or more, yet more preferably 8% or more, yet more preferably 10% or more, yet more preferably 14% or more, and particularly preferably 16% or more. Considering low-temperature solubility, transition temperature, electrical reliability, etc., the maximum ratio is preferably 30% or less, more preferably 25% or less, yet more preferably 22% or less, and particularly preferably less than 20%.

The compound represented by general formula (M-3) is the following compound.

[Chem. 34]

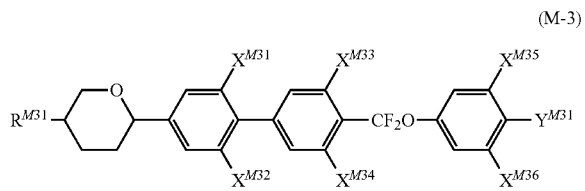

(M-3)

(In the formula, $R^{M31}$ represents an alkyl group having 1 to 5 carbon atoms, an alkenyl group having 2 to 5 carbon atoms, or an alkoxy group having 1 to 4 carbon atoms, $X^{M31}$ to $X^{M36}$ each independently represent a hydrogen atom or a fluorine atom, and $Y^{M31}$ represents a fluorine atom, a chlorine atom, or $OCF_3$.)

There are no limits on compounds that can be used in combination, but one or more compounds are preferably used in combination by considering low-temperature solubility, transition temperature, electrical reliability, birefringence, etc.

The content of the compounds represented by general formula (M-3) has an upper limit and a lower limit for each embodiment considering properties such as low-temperature solubility, transition temperature, electrical reliability, birefringence, etc.

The preferable lower limit of the content of the compounds represented by formula (M-3) relative to the total amount of the composition of the present invention is 1%, 2%, 4%, 5%, 8%, 10%, 13%, 15%, 18%, or 20%. The preferable upper limit of the content is 20%, 18%, 15%, 13%, 10%, 8%, or 5%.

The compounds represented by general formula (M-3) used in the composition of the present invention are specifically preferably compounds represented by formula (M-3.1) to formula (M-3.4). Among these, compounds represented by formula (M-3.1) and/or formula (M-3.2) are preferably contained.

[Chem. 35]

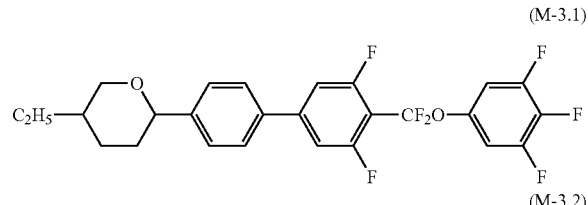

(M-3.1)

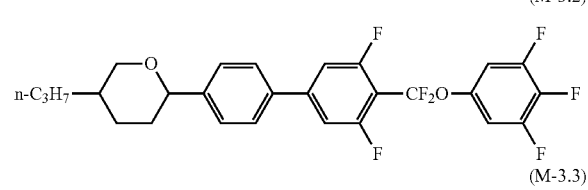

(M-3.2)

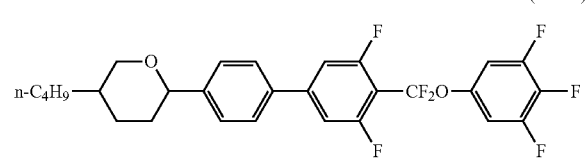

(M-3.3)

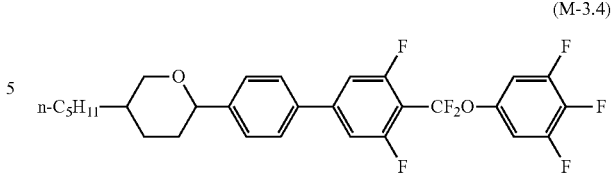

(M-3.4)

The preferable lower limit of the content of the compound represented by formula (M-3.1) relative to the total amount of the composition of the present invention is 1%, 2%, 4%, 5%, 8%, 10%, 13%, 15%, 18%, or 20%. The preferable upper limit of the content is 20%, 18%, 15%, 13%, 10%, 8%, or 5%.

The preferable lower limit of the content of the compound represented by formula (M-3.2) relative to the total amount of the composition of the present invention is 1%, 2%, 4%, 5%, 8%, 10%, 13%, 15%, 18%, or 20%. The preferable upper limit of the content is 20%, 18%, 15%, 13%, 10%, 8%, or 5%.

The preferable lower limit of the total content of the compounds represented by formula (M-3.1) and formula (M-3.2) relative to the total amount of the composition of the present invention is 1%, 2%, 4%, 5%, 8%, 10%, 13%, 15%, 18%, or 20%. The preferable upper limit of the content is 20%, 18%, 15%, 13%, 10%, 8%, or 5%.

The compound represented by general formula (M-4) is the following compound.

[Chem. 36]

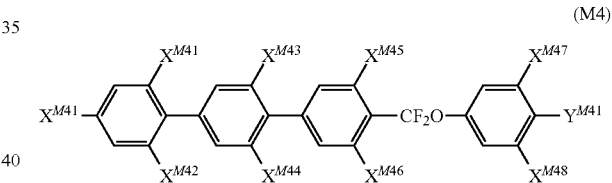

(M4)

(In the formula, $R^{M41}$ represents an alkyl group having 1 to 5 carbon atoms, an alkenyl group having 2 to 5 carbon atoms, or an alkoxy group having 1 to 4 carbon atoms, $X^{M41}$ to $X^{M48}$ each independently represent a fluorine atom or a hydrogen atom, and $Y^{M41}$ represents a fluorine atom, a chlorine atom, or $OCF_3$.)

The number of compounds that can be used in combination is not particularly limited. Considering low-temperature solubility, transition temperature, electrical reliability, birefringence, etc., 1, 2, or 3 or more compounds are preferably used in combination.

The content of the compound represented by general formula (M-4) has an upper limit and a lower limit for each embodiment considering properties such as low-temperature solubility, transition temperature, electrical reliability, birefringence, etc.

The preferable lower limit of the content of the compound represented by formula (M-4) relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

When the composition of the present invention is used in a liquid crystal display device having a small cell gap, the content of the compound represented by general formula (M-4) is preferably relatively high. When the composition is used in a liquid crystal display device having low driving voltage, the content of the compound represented by general formula (M-4) is preferably relatively high. When the composition is used in a liquid crystal display device used in a low-temperature environment, the content of the compound represented by general formula (M-4) is preferably relatively low. When the composition is used in a liquid crystal display device having high response speed, the content of the compound represented by general formula (M-4) is preferably relatively low.

The compounds represented by general formula (M-4) used in the composition of the present invention are preferably compounds represented by formula (M-4.1) to formula (M-4.4). Among these, compounds represented by formula (M-4.2) to formula (M-4.4) are preferably contained, and the compound represented by formula (M-4.2) is more preferably contained.

[Chem. 37]

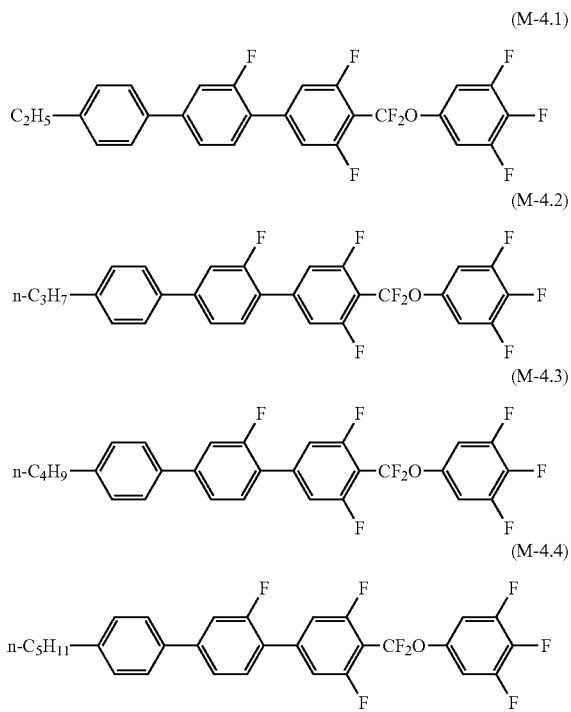

The compound represented by general formula (M-5) is the following compound.

[Chem. 38]

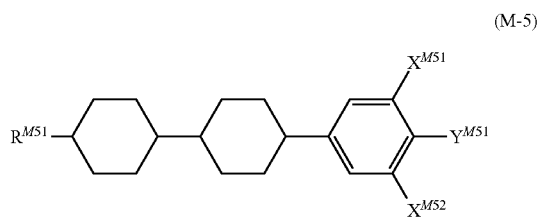

(In the formula, $R^{M51}$ represents an alkyl group having 1 to 5 carbon atoms, an alkenyl group having 2 to 5 carbon atoms, or an alkoxy group having 1 to 4 carbon atoms, $X^{M51}$ and $X^{M52}$ each independently represent a hydrogen atom or a fluorine atom, and $Y^{M51}$ represents a fluorine atom, a chlorine atom, or $OCF_3$.)

The number of compounds that can be used in combination is not particularly limited. Considering low-temperature solubility, transition temperature, electrical reliability, birefringence, etc., an appropriate combination is used for each embodiment. For example, one compound is used in one embodiment of the present invention, two compounds are used in another embodiment, three compounds are used in another embodiment, four compounds are used in another embodiment, five compounds are used in another embodiment, and six or more compounds are used in combination in another embodiment.

The preferable lower limit of the content of the compound represented by formula (M-5) relative to the total amount of the composition of the present invention is 1%, 2%, 5%, 8%, 10%, 13%, 15%, 18%, 20%, 22%, 25%, or 30%. The preferable upper limit of the content is 50%, 45%, 40%, 35%, 33%, 30%, 28%, 25%, 23%, 20%, 18%, 15%, 13%, 10%, 8%, or 5%.

If the composition of the present invention is to maintain low viscosity and have high response speed, the lower limit is preferably relatively low and the upper limit is preferably relatively low. If the composition of the present invention is to maintain high Tni and have less image-sticking, the lower limit is preferably relatively low and the upper limit is preferably relatively low. In order to increase dielectric anisotropy to keep driving voltage low, the lower limit is preferably relatively high and the upper limit is preferably relatively high.

The compounds represented by general formula (M-5) are preferably compounds represented by formula (M-5.1) to formula (M-5.4), and preferably compounds represented by formula (M-5.1) to formula (M-5.4).

[Chem. 39]

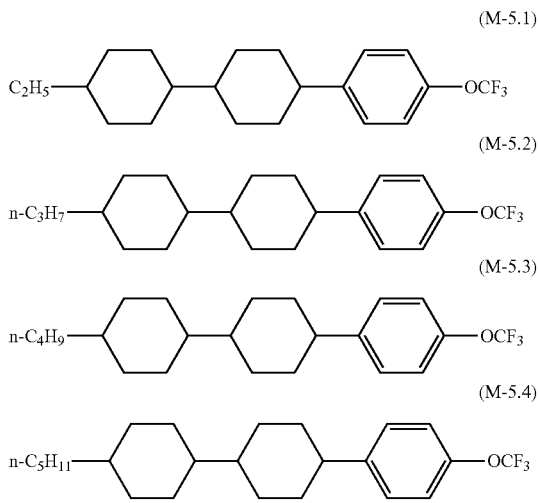

The preferable lower limit of the content of the compounds relative to the total amount of the composition of the present invention is 1%, 2%, 5%, 8%, 10%, 13%, or 15%. The preferable upper limit of the content is 30%, 28%, 25%, 23%, 20%, 18%, 15%, 13%, 10%, 8%, or 5%.

The compounds represented by general formula (M-5) are preferably compounds represented by formula (M-5.11) to formula (M-5.17), and preferably compounds represented by formula (M-5.11), formula (M-5.13), and formula (M-5.17).

[Chem. 40]

(M-5.11)

(M-5.12)
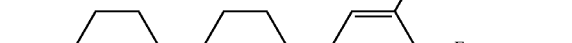

(M-5.13)
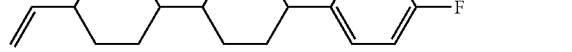

(M-5.14)

(M-5.15)

(M-5.16)
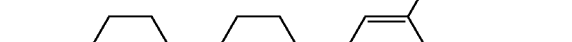

(M-5.17)
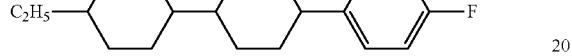

The preferable lower limit of the content of these compounds relative to the total amount of the composition of the present invention is 1%, 2%, 5%, 8%, 10%, 13%, or 15%. The preferable upper limit of the content is 30%, 28%, 25%, 23%, 20%, 18%, 15%, 13%, 10%, 8%, or 5%.

The compounds represented by general formula (M-5) are preferably compounds represented by formula (M-5.21) to formula (M-5.28), and are preferably compounds represented by formula (M-5.21), formula (M-5.22), formula (M-5.23), and formula (M-5.25).

[Chem. 41]

(M-5.21)
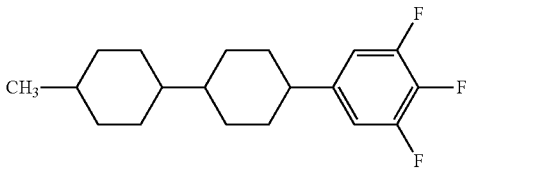

(M-5.22)
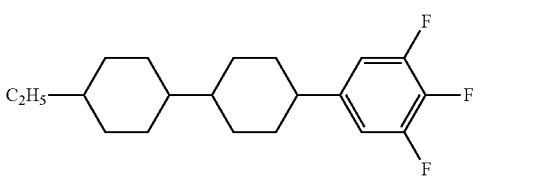

(M-5.23)
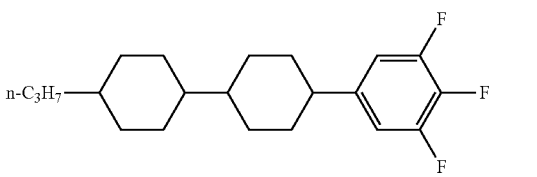

(M-5.24)
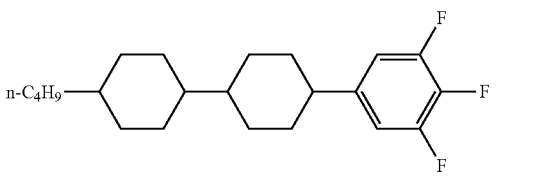

(M-5.25)
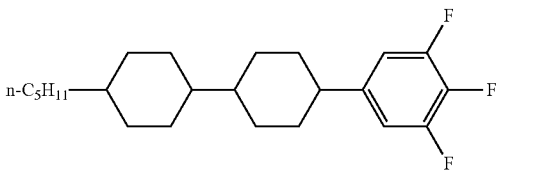

(M-5.26)
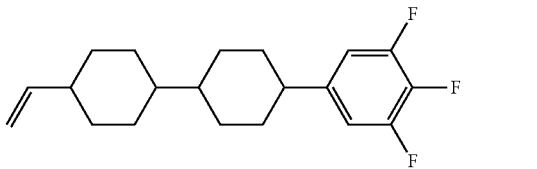

(M-5.27)
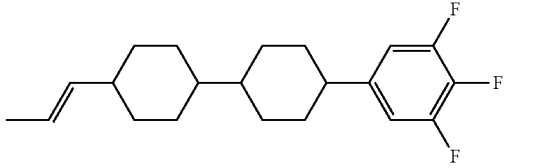

(M-5.28)
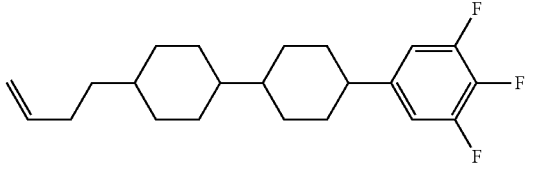

The preferable lower limit of the content of these compounds relative to the total amount of the composition of the present invention is 1%, 2%, 5%, 8%, 10%, 13%, 15%, 18%, 20%, 22%, 25%, or 30%. The preferable upper limit of the content is 40%, 35%, 33%, 30%, 28%, 25%, 23%, 20%, 18%, 15%, 13%, 10%, 8%, or 5%.

The compound represented by general formula (M-6) is the following compound.

[Chem. 42]

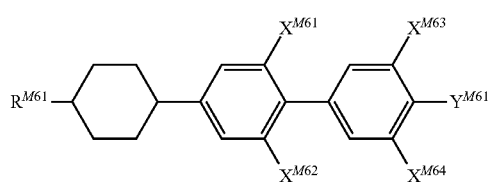

(M-6)

(In the formula, $R^{M61}$ represents an alkyl group having 1 to 5 carbon atoms, an alkenyl group having 2 to 5 carbon atoms, or an alkoxy group having 1 to 4 carbon atoms, $X^{M61}$ to $X^{M64}$ each independently represent a fluorine atom or a hydrogen atom, and $Y^{M61}$ represents a fluorine atom, a chlorine atom, or $OCF_3$.)

The number of compounds that can be used in combination is not particularly limited. Considering low-temperature solubility, transition temperature, electrical reliability, birefringence, etc., an appropriate combination is used for each embodiment.

The preferable lower limit of the content of the compound represented by formula (M-6) relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

When the composition of the present invention is used in a liquid crystal display device having low driving voltage, the content of the compound represented by general formula (M-6) is preferably relatively high. When the composition is used in a liquid crystal display device having high response speed, the content of the compound represented by general formula (M-6) is preferably relatively low.

The compounds represented by general formula (M-6) are specifically preferably compounds represented by formula (M-6.1) to formula (M-6.4). In particular, compounds represented by formula (M-6.2) and formula (M-6.4) are preferably contained.

[Chem. 43]

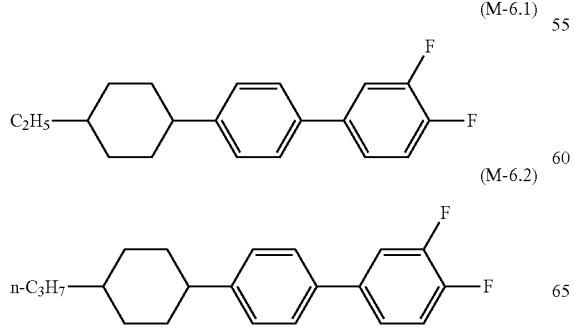

(M-6.1)

(M-6.2)

(M-6.3)

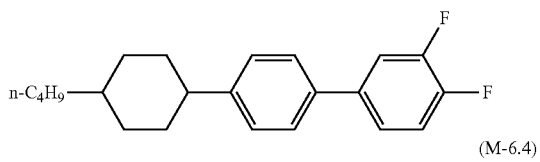

(M-6.4)

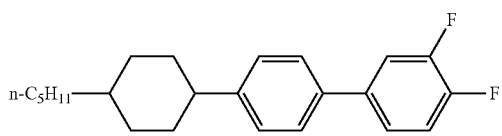

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compounds represented by general formula (M-6) are specifically preferably compounds represented by formula (M-6.11) to formula (M-6.14). Among these, compounds represented by formula (M-6.12) and formula (M-6.14) are preferably contained.

[Chem. 44]

(M-6.11)

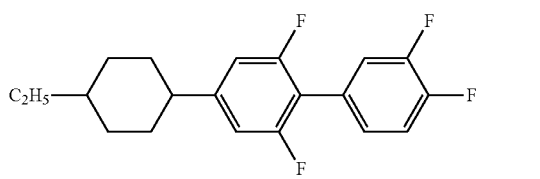

(M-6.12)

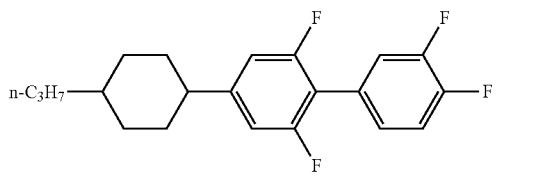

(M-6.13)

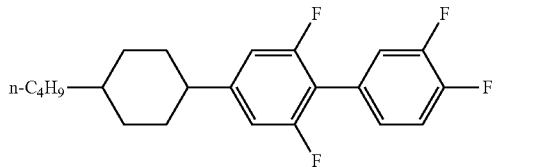

(M-6.14)

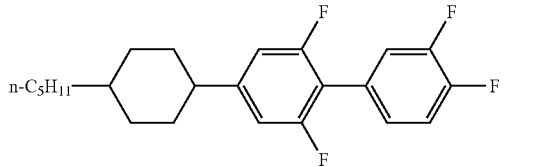

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compound represented by general formula (M-6) is specifically preferably a compound or compounds represented by formula (M-6.21) to formula (M-6.24). Among these, compounds represented by formula (M-6.21), formula (M-6.22), and formula (M-6.24) are preferably contained.

[Chem. 45]

(M-6.21)

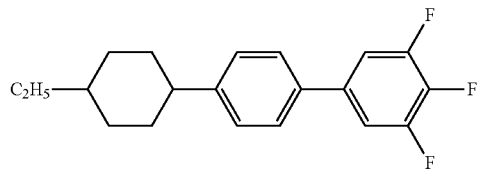

(M-6.22)

(M-6.23)

(M-6.24)

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compounds represented by general formula (M-6) are specifically preferably compounds represented by formula (M-6.31) to formula (M-6.34). Among these, compounds represented by formula (M-6.31) and formula (M-6.32) are preferably contained.

[Chem. 46]

(M-6.31)

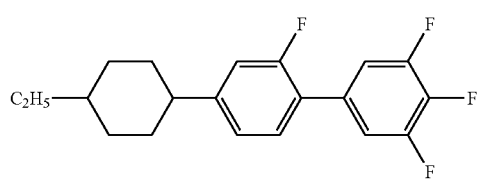

(M-6.32)

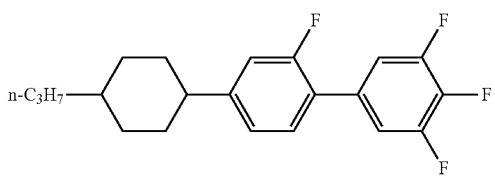

(M-6.33)

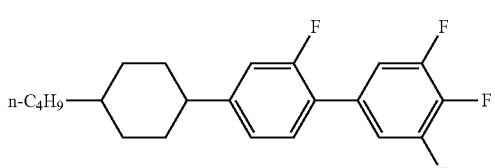

(M-6.34)

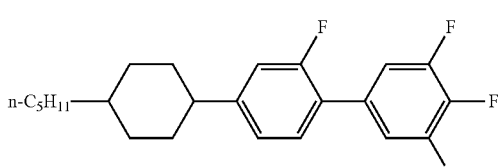

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compounds represented by general formula (M-6) are preferably compounds represented by formula (M-6.41) to formula (M-6.44). Among these, a compound represented by formula (M-6.42) is preferably contained.

[Chem. 47]

(M-6.41)

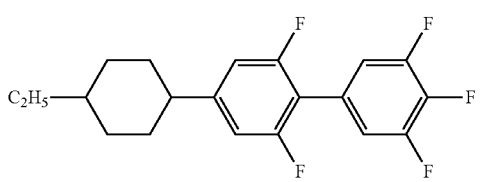

(M-6.42)

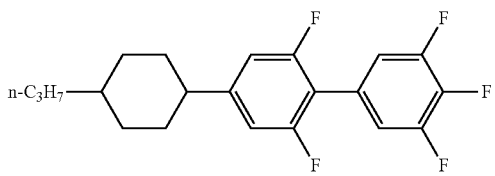

(M-6.43)

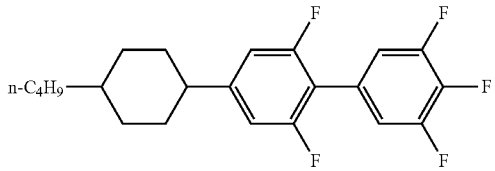

-continued (M-6.44)

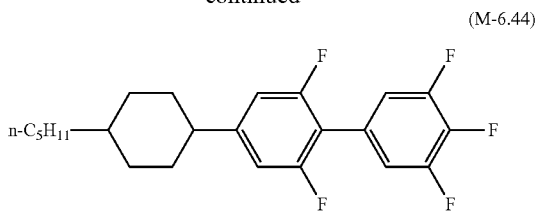

The preferable lower limit of the content of these compounds relative to the total amount of the composition of the present invention is 1%, 2%, 4%, 5%, 8%, 10%, 13%, 15%, 18%, of 20%. The preferable upper limit of the content is 30%, 28%, 25%, 23%, 20%, 18%, 15%, 13%, 10%, 8%, or 5%.

The compound represented by general formula (M-7) is the following compound.

[Chem. 48]

(M-7)

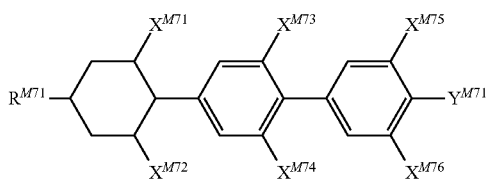

(In the formula, $X^{M71}$ to $X^{M76}$ each independently represent a fluorine atom or a hydrogen atom, $R^{M71}$ represents an alkyl group having 1 to 5 carbon atoms, an alkenyl group having 2 to 5 carbon atoms, or an alkoxy group having 1 to 4 carbon atoms, and $Y^{M71}$ represents a fluorine atom or $OCF_3$.)

The number of compounds that can be used in combination is not particularly limited. Preferably, one or two compounds, more preferably one to three compounds, and more preferably one to four compounds among these compounds are contained.

The content of the compound represented by general formula (M-7) has an upper limit and a lower limit for each embodiment considering properties such as low-temperature solubility, transition temperature, electrical reliability, birefringence, etc.

The preferable lower limit of the content of the compound represented by formula (M-7) relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

When the composition of the present invention is used in a liquid crystal display device having a small cell gap, the content of the compound represented by general formula (M-7) is preferably relatively high. When the composition is used in a liquid crystal display device having low driving voltage, the content of the compound represented by general formula (M-7) is preferably relatively high. When the composition is used in a liquid crystal display device used in a low-temperature environment, the content of the compound represented by general formula (M-7) is preferably relatively low. When the composition is used in a liquid crystal display device having high response speed, the content of the compound represented by general formula (M-7) is preferably relatively low.

The compounds represented by general formula (M-7) are preferably compounds represented by formula (M-7.1) to formula (M-7.4), and a compound represented by formula (M-7.2) is preferable.

[Chem. 49]

(M-7.1)

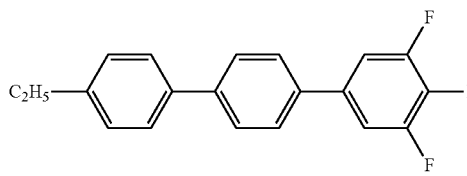

(M-7.2)

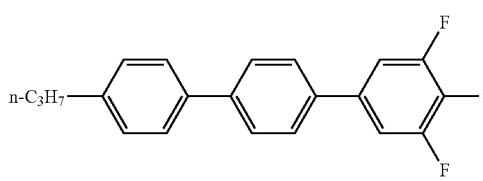

(M-7.3)

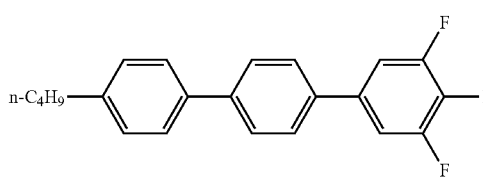

(M-7.4)

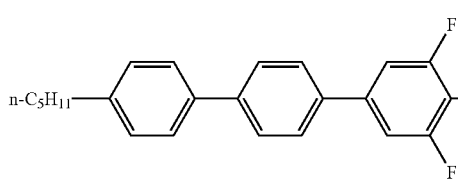

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compounds represented by general formula (M-7) are preferably compounds represented by formula (M-7.11) to formula (M-7.14), and preferably compounds represented by formula (M-7.11) and formula (M-7.12).

[Chem. 50]

(M-7.11)

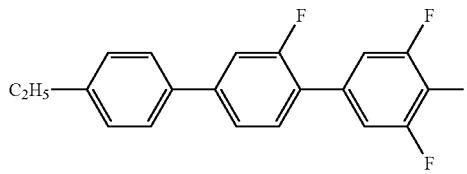

-continued (M-7.12)

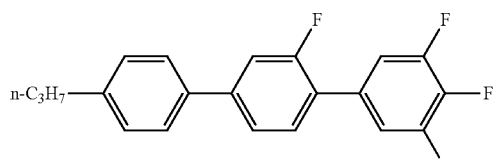

(M-7.13)

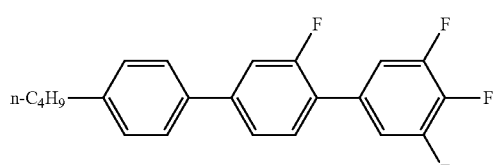

(M-7.14)

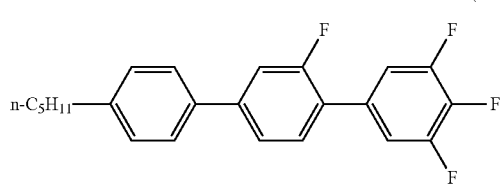

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compounds represented by general formula (M-7) are preferably compounds represented by formula (M-7.21) to formula (M-7.24), and preferably compounds represented by formula (M-7.21) and formula (M-7.22).

[Chem. 51]

(M-7.21)

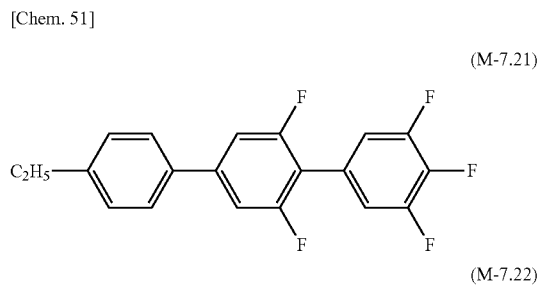

(M-7.22)

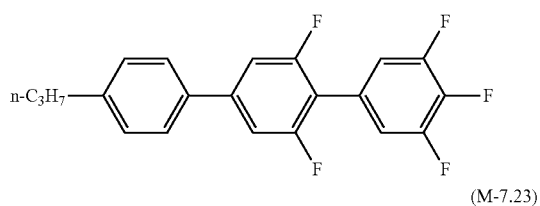

(M-7.23)

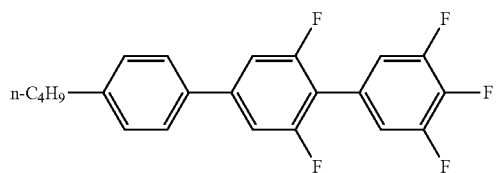

-continued (M-7.24)

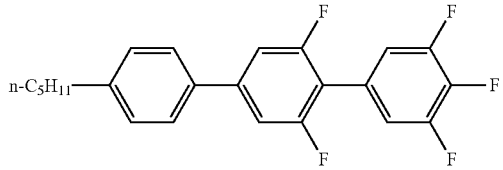

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compound represented by general formula (M-8) is the following compound.

[Chem. 52]

(M-8)

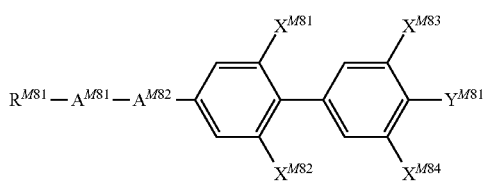

(In the formula, $X^{M81}$ to $X^{M84}$ each independently represent a fluorine atom or a hydrogen atom, $Y^{M81}$ represents a fluorine atom, a chlorine atom, or —$OCF_3$, $R^{M81}$ represents an alkyl group having 1 to 5 carbon atoms, an alkenyl group having 2 to 5 carbon atoms, or an alkoxy group having 1 to 4 carbon atoms, $A^{M81}$ and $A^{M82}$ each independently represent a 1,4-cyclohexylene group, a 1,4-phenylene group or

[Chem. 53]

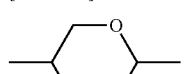

[Chem. 54]

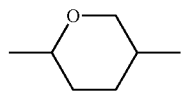

[Chem. 55]

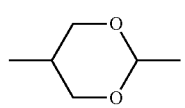

and a hydrogen atom of the 1,4-phenylene group may be substituted with a fluorine atom.)

The preferable lower limit of the content of the compound represented by general formula (M-8) relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

If the composition of the present invention is to maintain low viscosity and have high response speed, the lower limit is preferably relatively low and the upper limit is preferably relatively low. If a composition with less image-sticking is required, the lower limit is preferably relatively low and the upper limit is preferably relatively low. In order to increase dielectric anisotropy to keep driving voltage low, the lower limit is preferably relatively high and the upper limit is preferably relatively high.

The compounds represented by general formula (M-8) used in the composition of the present invention are preferably specifically compounds represented by formula (M-8.1) to formula (M-8.4). Among these, compounds represented by formula (M-8.1) and formula (M-8.2) are preferably contained.

[Chem. 56]

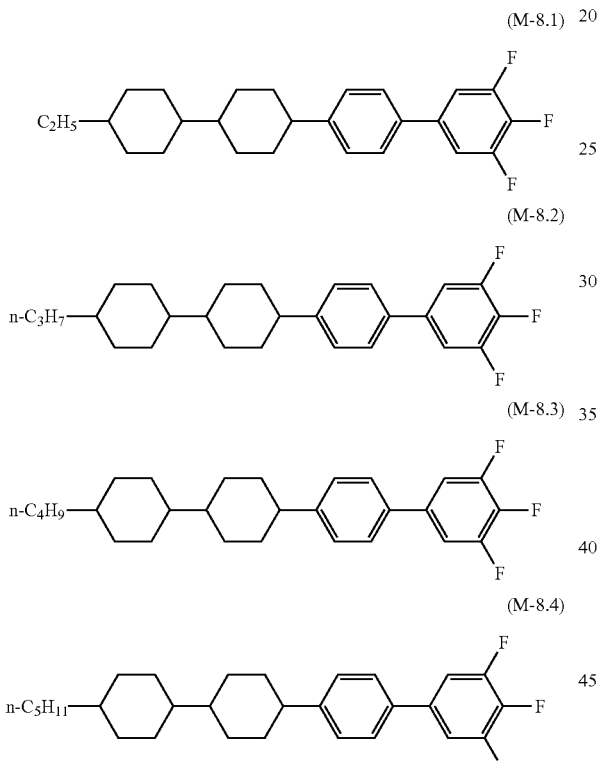

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compound represented by general formula (M-8) used in the composition of the present invention is specifically preferably a compound or compounds represented by formula (M-8.11) to formula (M-8.14). Among these, a compound represented by formula (M-8.12) is preferably contained.

[Chem. 57]

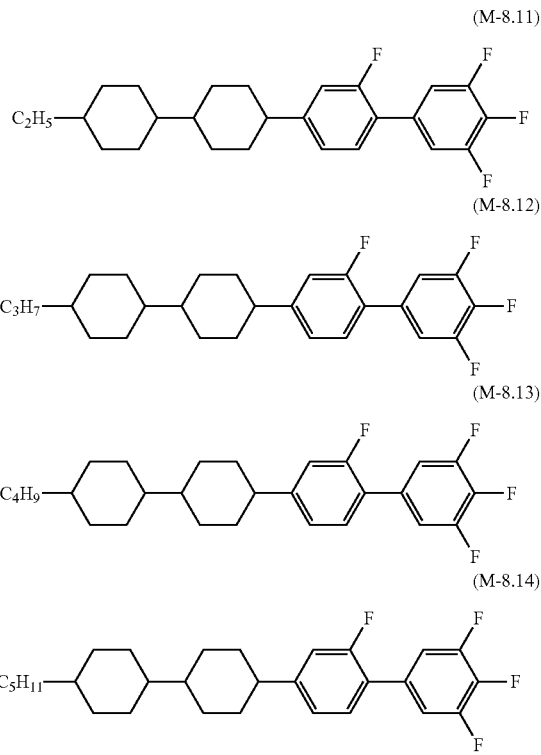

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compounds represented by general formula (M-8) used in the composition of the present invention are specifically preferably compounds represented by formula (M-8.21) to formula (M-8.24). Among these, the compound represented by formula (M-8.22) is preferably contained.

[Chem. 58]

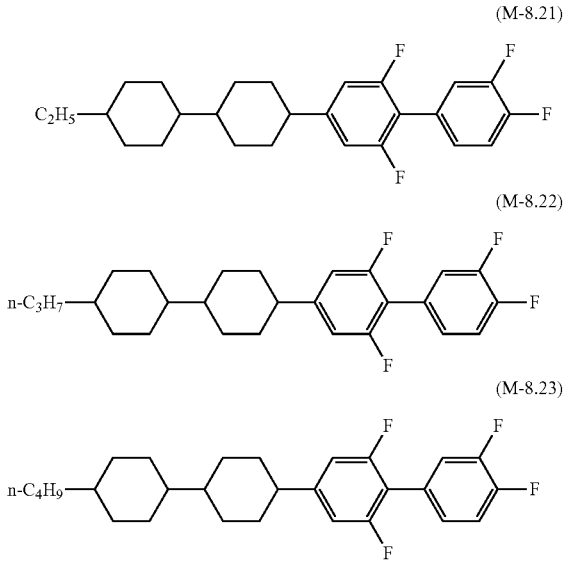

-continued (M-8.24)
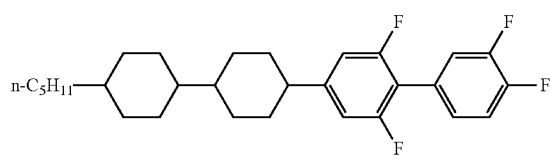

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compounds represented by general formula (M-8) used in the composition of the present invention are specifically preferably compounds represented by formula (M-8.31) to formula (M-8.34). Among these, a compound represented by formula (M-8.32) is preferably contained.

[Chem. 59]

(M-8.31)
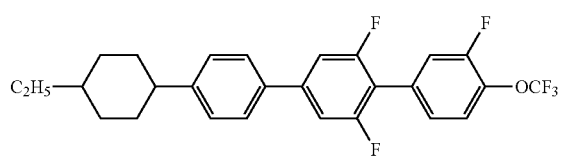

(M-8.32)
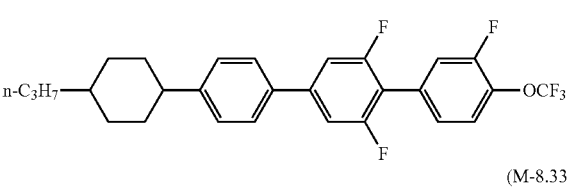

(M-8.33)
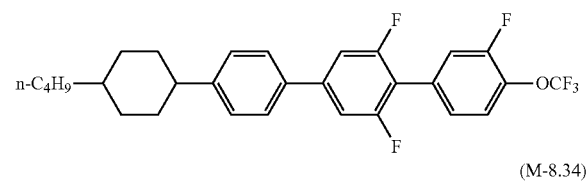

(M-8.34)
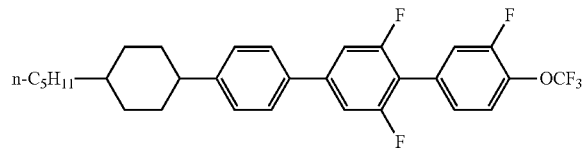

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compounds represented by general formula (M-8) used in the composition of the present invention are specifically preferably compounds represented by formula (M-8.41) to formula (M-8.44). Among these, a compound represented by formula (M-8.42) is preferably contained.

[Chem. 60]

(M-8.41)
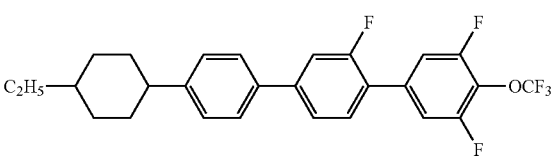

(M-8.42)
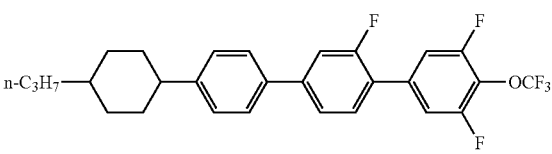

(M-8.43)
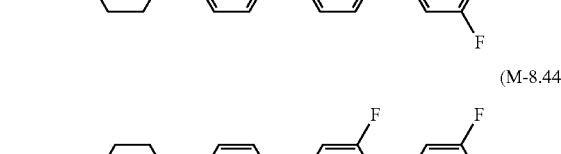

(M-8.44)
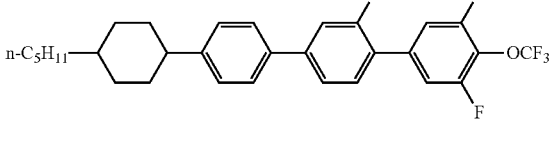

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The compounds represented by general formula (M-8) used in the composition of the present invention are specifically preferably compounds represented by formula (M-8.51) to formula (M-8.54). Among these, a compound represented by formula (M-8.52) is preferably contained.

[Chem. 61]

(M-8.51)
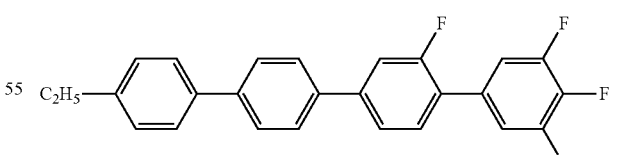

(M-8.52)
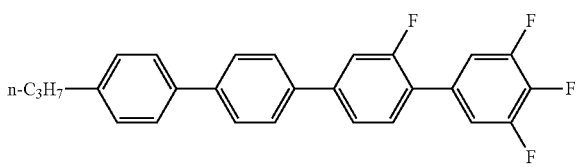

-continued (M-8.53)

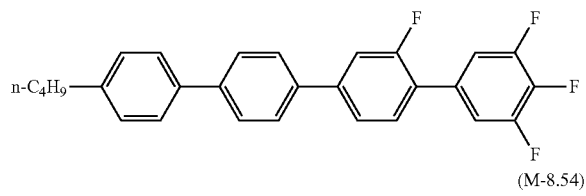

(M-8.54)

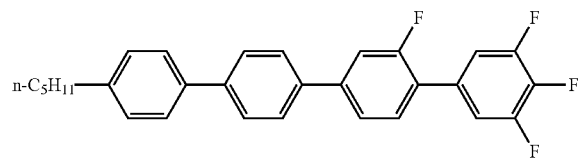

The preferable lower limit of the content of these compounds relative to the total amount of the composition of the present invention is 1%, 2%, 4%, 5%, 8%, 10%, 13%, 15%, 18%, or 20%. The preferable upper limit of the content is 30%, 28%, 25%, 23%, 20%, 18%, 15%, 13%, 10%, 8%, or 5%.

The composition of the present invention preferably contains one or more compounds represented by general formula (L). Compounds represented by general formula (L) correspond to substantially dielectrically neutral compounds (Δε value of −2 to 2).

[Chem. 62]

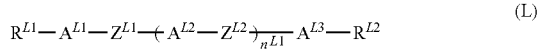

(L)

(In the formula, $R^{L1}$ and $R^{L2}$ each independently represent an alkyl group having 1 to 8 carbon atoms, and one —$CH_2$— or two or more nonadjacent —$CH_2$— in the alkyl group may each independently be substituted with —C≡C—, —O—, —CO—, —COO—, or —OCO—, $n^{L1}$ represents 0, 1, 2, or 3, $A^{L1}$, $A^{L2}$, and $A^{L3}$ each independently represent a group selected from the group consisting of (a) a 1,4-cyclohexylene group (one —$CH_2$— or two or more nonadjacent —$CH_2$— in this group may each be substituted with —O—), (b) a 1,4-phenylene group (one —CH= or two or more nonadjacent —CH= in this group may each be substituted with —N=), and (c) (c) a naphthalene-2,6-diyl group, a 1,2,3,4-tetrahydronaphthalene-2,6-diyl group, or a decahydronaphthalene-2,6-diyl group (one —CH= or two or more nonadjacent —CH= in the naphthalene-2,6-diyl group or the 1,2,3,4-tetrahydronaphthalene-2,6-diyl group may each be substituted with —N=), the group (a), the group (b), and the group (c) may each independently be substituted with a cyano group, a fluorine atom, or a chlorine atom, $Z^{L1}$ and $Z^{L2}$ each independently represent a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF—, or —C≡C—, when $n^{L1}$ represents 2 or 3 and two or more $A^{L2}$ are present, they may be the same or different; when $n^{L1}$ represents 2 or 3 and two or more $Z^{L3}$ are present, they may be the same or different; however, compounds represented by general formulae (i), (ii), and (M) are excluded.)

Compounds represented by general formula (L) may be used alone or in combination. The number of compounds that can be used in combination is not particularly limited and is selected in accordance with the desired properties such as low-temperature solubility, transition temperature, electrical reliability, and birefringence. The number of compounds used is, for example, 1 in one embodiment of the present invention, and 2, 3, 4, 5, 6, 7, 8, 9, or 10 or more in other embodiments of the present invention.

In the composition of the present invention, the content of the compound represented by general formula (L) must be appropriately adjusted in accordance with the desired properties, such as low-temperature solubility, transition temperature, electrical reliability, birefringence, process compatibility, drop marks, image-sticking, and dielectric anisotropy.

The preferable lower limit of the content of the compounds represented by formula (L) relative to the total amount of the composition of the present invention is 1%, 10%, 20%, 30%, 40%, 50%, 55%, 60%, 65%, 70%, 75%, or 80%. The preferable upper limit of the content is 95%, 85%, 75%, 65%, 55%, 45%, 35%, or 25%.

If the composition of the present invention is to maintain low viscosity and have high response speed, the lower limit is preferably high and the upper limit is preferably high. If the composition of the present invention is to maintain high Tni and have excellent temperature stability, the lower limit is preferably high and the upper limit is preferably high. In order to increase dielectric anisotropy to keep the driving voltage low, the lower limit is preferably low and the upper limit is preferably low.

If reliability is important, $R^{L1}$ and $R^{L2}$ preferably each represent an alkyl group. If decreasing the volatility of the compound is important, an alkoxy group is preferable.

If the ring structure $R^{L1}$ and $R^{L2}$ are bonded to is a phenyl group (aromatic), a straight-chain alkyl group having 1 to 5 carbon atoms and a straight-chain alkoxy group having 1 to 4 carbon atoms are preferred. If the ring structure they are bonded to is a saturated ring structure such as cyclohexane, pyran, or dioxane, a straight-chain alkyl group having 1 to 5 carbon atoms is preferred. In order to stabilize the nematic phase, the total number of carbon atoms and oxygen atoms, if exist at all, is preferably 5 or less and a straight-chain structure is preferred.

If response speed is important, $n^{L1}$ preferably represents 0. In order to improve the upper limit temperature of the nematic phase, 2 or 3 is preferable. To strike the balance, 1 is preferable. In order to satisfy properties required as the composition, compounds having different values are preferably used in combination.

If Δn needs to be increased, $A^{L1}$, $A^{L2}$, and $A^{L3}$ are preferably aromatic. In order to improve response speed, aliphatic is preferable. Preferably, they each independently represent a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group. More preferably they each represent any one of the following structures.

[Chem. 63]

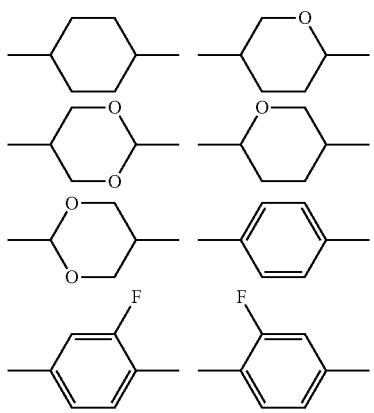

A trans-1,4-cyclohexylene group or a 1,4-phenylene group is yet more preferable.

If response speed is important, $Z^{L1}$ and $Z^{L2}$ each preferably represent a single bond.

The compound represented by general formula (L) is preferably a compound selected from the group consisting of compounds represented by general formulae (L-1) to (L-7).

The compound represented by general formula (L-1) is the following compound.

[Chem. 64]

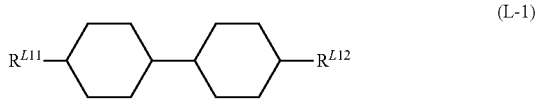
(L-1)

(In the formula, $R^{L11}$ and $R^{L12}$ are independently respectively the same as $R_{L1}$ and $R^{L2}$ in general formula (L).)

$R^{L11}$ and $R^{L12}$ preferably represent a straight-chain alkyl group having 1 to 5 carbon atoms and a straight-chain alkoxy group having 1 to 4 carbon atoms.

The compounds represented by general formula (L-1) can be used alone or in combination of two or more compounds. The number of compounds that can be used in combination is not particularly limited and is selected in accordance with the desired properties such as low-temperature solubility, transition temperature, electrical reliability, and birefringence. The number of compounds used is, for example, 1, 2, 3, 4, or 5 or more in one embodiment of the present invention.

The preferable lower limit of the content relative to the total amount of the composition of the present invention is 1%, 2%, 3%, 5%, 7%, 10%, 15%, 20%, 25%, 30%, 35%, 40%, 45%, 50%, or 55%. The preferable upper limit of the content relative to the total amount of the composition of the present invention is 95%, 90%, 85%, 80%, 75%, 70%, 65%, 60%, 55%, 50%, 45%, 40%, 35%, 30%, or 25%.

If the composition of the present invention is to maintain low viscosity and have high response speed, the lower limit is preferably high and the upper limit is preferably high. If the composition of the present invention is to maintain high Tni and have excellent temperature stability, the lower limit is preferably medium and the upper limit is preferably medium. In order to increase dielectric anisotropy to keep the driving voltage low, the lower limit is preferably low and the upper limit is preferably low.

The compound represented by general formula (L-1) is preferably a compound selected from the group consisting of compounds represented by general formula (L-1-3).

[Chem. 65]

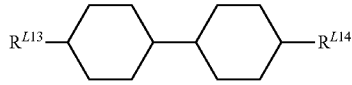
(I-1-3)

(In the formula, $R^{L13}$ and $R^{L14}$ each independently represent an alkyl group having 1 to 8 carbon atoms or an alkoxy group having 1 to 8 carbon atoms.)

Preferable examples of $R^{L13}$ and $R^{L14}$ are a straight-chain alkyl group having 1 to 5 carbon atoms, a straight-chain alkoxy group having 1 to 4 carbon atoms, and a straight-chain alkenyl group having 2 to 5 carbon atoms.

The preferable lower limit of the content of the compound represented by formula (L-1-3) relative to the total amount of the composition of the present invention is 1%, 5%, 10%, 13%, 15%, 17%, 20%, 23%, 25%, or 30%. The preferable upper limit of the content relative to the total amount of the composition of the present invention is 60%, 55%, 50%, 45%, 40%, 37%, 35%, 33%, 30%, 27%, 25%, 23%, 20%, 17%, 15%, 13%, or 10%.

The compound represented by general formula (L-1-3) is preferably a compound selected from the group consisting of compounds represented by formula (L-1-3.1) to formula (L-1-3.12), and more preferably a compound represented by formula (L-1-3.1), formula (L-1-3.3), or formula (L-1-3.4). In particular, the compound represented by formula (L-1-3.1) is preferable since the response speed of the composition of the present invention is notably improved. If high Tni is desirable rather than the response speed, compounds represented by formula (L-1-3.3), formula (L-1-3.4), formula (L-1-3.11), and formula (L-1-3.12) are preferable. The total content of the compounds represented by formula (L-1-3.3), formula (L-1-3.4), formula (L-1-3.11), and formula (L-1-3.12) is preferably less than 20% in order to improve low-temperature solubility.

[Chem. 66]

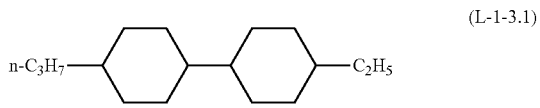
(L-1-3.1)

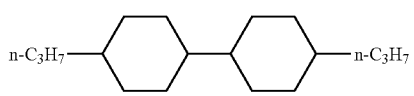
(L-1-3.2)

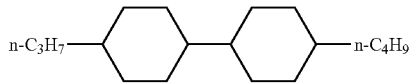
(L-1-3.3)

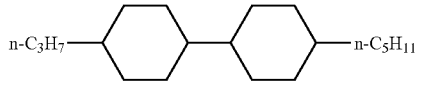
(L-1-3.4)

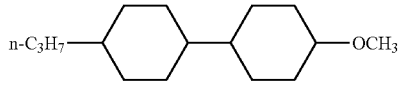
(L-1-3.11)

-continued (L-1-3.12)
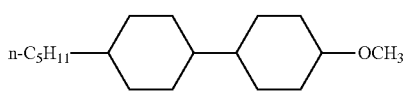

The preferable lower limit of the content of the compound represented by formula (L-1-3.1) relative to the total amount of the composition of the present invention is 1%, 2%, 3%, 5%, 7%, 10%, 13%, 15%, 18%, or 20%. The preferable upper limit of the content relative to the total amount of the composition of the present invention is 20%, 17%, 15%, 13%, 10%, 8%, 7%, or 6%.

The compound represented by general formula (L-2) is the following compound.

[Chem. 67]

(L-2)
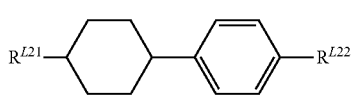

(In the formula, $R^{L21}$ and $R^{L22}$ are respectively independently the same as $R^{L1}$ and $R^{L2}$ in general formula (L).)

$R^{L21}$ preferably represents an alkyl group having 1 to 5 carbon atoms and $R^{L22}$ preferably represents an alkyl group having 1 to 5 carbon atoms or an alkoxy group having 1 to 4 carbon atoms.

The compounds represented by general formula (L-1) can be used alone or in combination. The number of compounds that can be used in combination is not particularly limited and is selected in accordance with the desired properties such as low-temperature solubility, transition temperature, electrical reliability, and birefringence. The number of compounds used is, for example, 1, 2, 3, 4, or 5 or more in one embodiment of the present invention.

If low-temperature solubility is important, the content is preferably relatively high in order to enhance the effect. In contrast, if response speed is important, the content is preferably relatively small in order to enhance the effect. The content range is preferably set medium if drop marks and image-sticking properties are to be improved.

The preferable lower limit of the content of the compound represented by formula (L-2) relative to the total amount of the composition of the present invention is 1%, 2%, 3%, 5%, 7%, or 10%. The preferable upper limit of the content relative to the total amount of the composition of the present invention is 20%, 15%, 13%, 10%, 8%, 7%, 6%, 5%, or 3%.

The compound represented by general formula (L-2) is preferably a compound selected from the group consisting of compounds represented by formula (L-2.1) to formula (L-2.6). Compounds represented by formula (L-2.1), formula (L-2.3), formula (L-2.4), and formula (L-2.6) are preferable.

[Chem. 68]

(L-2.1)
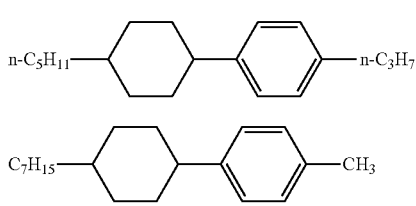

(L-2.2)

(L-2.3)
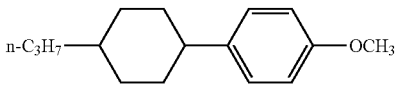

(L-2.4)

(L-2.5)
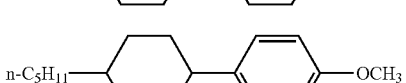

(L-2.6)
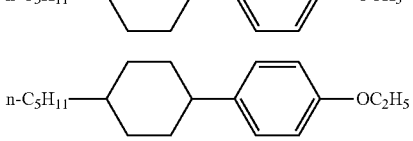

The compound represented by general formula (L-3) is the following compound.

[Chem. 69]

(L-3)
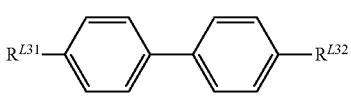

(In the formula, $R^{L31}$ and $R^{L32}$ are respectively independently the same as $R^{L1}$ and $R^{L2}$ in general formula (L).)

$R^{L31}$ and $R^{L32}$ preferably each independently represent an alkyl group having 1 to 5 carbon atoms or an alkoxy group having 1 to 4 carbon atoms.

The compounds represented by general formula (L-3) can be used alone or in combination. The number of compounds that can be used in combination is not particularly limited and is selected in accordance with the desired properties such as low-temperature solubility, transition temperature, electrical reliability, and birefringence. The number of compounds used is, for example, 1, 2, 3, 4, or 5 or more in one embodiment of the present invention.

The preferable lower limit of the content of the compound represented by formula (L-3) relative to the total amount of the composition of the present invention is 1%, 2%, 3%, 5%, 7%, or 10%. The preferable upper limit of the content relative to the total amount of the composition of the present invention is 20%, 15%, 13%, 10%, 8%, 7%, 6%, 5%, or 3%.

In order to obtain high birefringence, it is effective to set the content to a relatively high level. If high Tni is important, it is effective to set the content to a relatively low level. The content range is preferably set medium if drop marks and image-sticking properties are to be improved.

The compound represented by general formula (L-3) is preferably a compound selected from the group consisting of compounds represented by formula (L-3.1) to formula (L-3.4), and is preferably compounds represented by formula (L-3.2) to formula (L-3.7).

[Chem. 70]

(L-3.1)
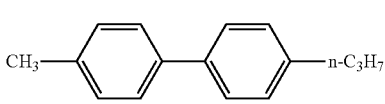

(L-3.2)

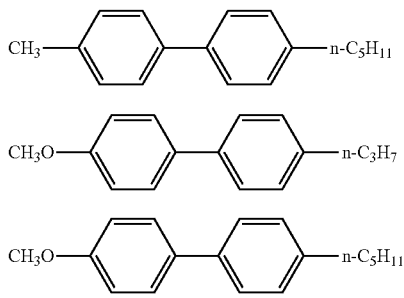

(L-3.6)

(L-3.7)

The compound represented by general formula (L-4) is the following compound.

[Chem. 71]

(L-4)

(In the formula, $R^{L41}$ and $R^{L42}$ are independently respectively the same as $R^{L1}$ and $R^{L2}$ in general formula (L).)

$R^{L41}$ preferably represents an alkyl group having 1 to 5 carbon atoms and $R^{L42}$ preferably represents an alkyl group having 1 to 5 carbon atoms or an alkoxy group having 1 to 4 carbon atoms.

The compounds represented by general formula (L-4) can be used alone or in combination. The number of compounds that can be used in combination is not particularly limited and is selected in accordance with the desired properties such as low-temperature solubility, transition temperature, electrical reliability, and birefringence. The number of compounds used is, for example, 1, 2, 3, 4, or 5 or more in one embodiment of the present invention.

In the composition of the present invention, the content of the compound represented by general formula (L-4) must be appropriately adjusted in accordance with the desired properties, such as low-temperature solubility, transition temperature, electrical reliability, birefringence, process compatibility, drop marks, image-sticking, and dielectric anisotropy.

The preferable lower limit of the content of the compound represented by formula (L-4) relative to the total amount of the composition of the present invention is 1%, 2%, 3%, 5%, 7%, 10%, 14%, 16%, 20%, 23%, 26%, 30%, 35%, or 40%. The preferable upper limit of the content of the compound represented by formula (L-4) relative to the total amount of the composition of the present invention is 50%, 40%, 35%, 30%, 20%, 15%, 10%, or 5%.

The compounds represented by general formula (L-4) are preferably compounds represented by formula (L-4.4) to formula (L-4.6), for example. A compound represented by formula (L-4.4) is preferable.

[Chem. 72]

(L-4.4)

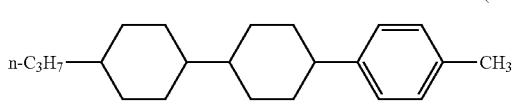

(L-4.5)

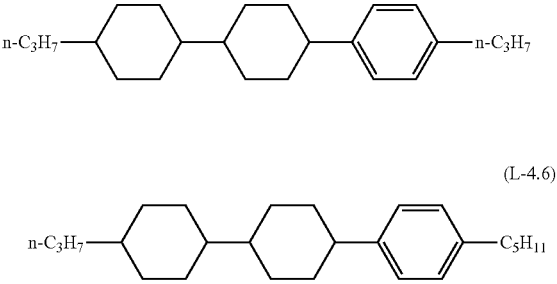

(L-4.6)

Depending on the desired properties such as low-temperature solubility, transition temperature, electrical reliability, and birefringence, the compound represented by formula (L-4.4) may be contained, the compound represented by formula (L-4.5) may be contained, or both the compound represented by formula (L-4.4) and the compound represented by formula (L-4.5) may be contained.

The preferable lower limit of the content of the compound represented by formula (L-4.4) or formula (L-4.5) relative to the total amount of the composition of the present invention is 3%, 5%, 7%, 9%, 11%, 12%, 13%, 18%, or 21%. The preferable upper limit is 45, 40%, 35%, 30%, 25%, 23%, 20%, 18%, 15%, 13%, 10%, or 8%.

When the compounds represented by formula (L-4.4) and formula (L-4.5) are both contained, the preferable lower limit of the total content of the two compounds relative to the total amount of the composition of the present invention is 15%, 19%, 24%, or 30% and the preferable upper limit is 45, 40%, 35%, 30%, 25%, 23%, 20%, 18%, 15%, or 13%.

The compounds represented by general formula (L-4) are preferably compounds represented by formula (L-4.7) to formula (L-4.10) and a compound represented by formula (L-4.9) is preferable.

[Chem. 73]

(L-4.7)

(L-4.8)

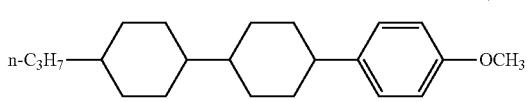

(L-4.9)

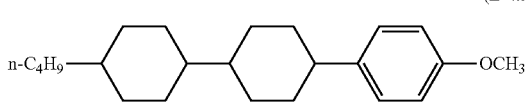

(L-4.10)

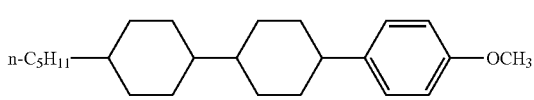

The compound represented by general formula (L-5) is the following compound.

[Chem. 74]

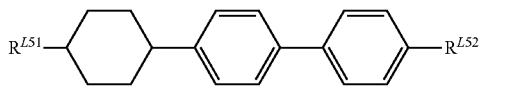
(L-5)

(In the formula, $R^{L51}$ and $R^{L52}$ are independently respectively the same as $R^{L1}$ and $R^{L2}$ in general formula (L).)

$R^{L51}$ preferably represents an alkyl group having 1 to 5 carbon atoms and $R^{L52}$ preferably represents an alkyl group having 1 to 5 carbon atoms or an alkoxy group having 1 to 4 carbon atoms.

The compounds represented by general formula (L-5) can be used alone or in combination. The number of compounds that can be used in combination is not particularly limited and is selected in accordance with the desired properties such as low-temperature solubility, transition temperature, electrical reliability, and birefringence. The number of compounds used is, for example, 1, 2, 3, 4, or 5 or more in one embodiment of the present invention.

In the composition of the present invention, the content of the compound represented by general formula (L-5) must be appropriately adjusted in accordance with the desired properties, such as low-temperature solubility, transition temperature, electrical reliability, birefringence, process compatibility, drop marks, image-sticking, and dielectric anisotropy.

The preferable lower limit of the content of the compound represented by formula (L-5) relative to the total amount of the composition of the present invention is 1%, 2%, 3%, 5%, 7%, 10%, 14%, 16%, 20%, 23%, 26%, 30%, 35%, or 40%. The preferable upper limit of the content of the compound represented by formula (L-5) relative to the total amount of the composition of the present invention is 50%, 40%, 35%, 30%, 20%, 15%, 10%, or 5%.

The compound represented by general formula (L-5) is preferably a compound represented by formula (L-5.1) or formula (L-5.2) and is particularly preferably a compound represented by formula (L-5.1).

The preferable lower limit of the content of these compounds relative to the total amount of the composition of the present invention is 1%, 2%, 3%, 5%, or 7%. The preferable upper limit of the content of the compounds is 20%, 15%, 13%, 10%, or 9%.

[Chem. 75]

(L-5.1)

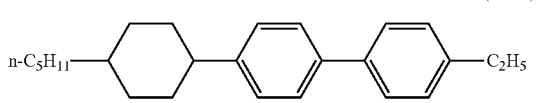
(L-5.2)

The compound represented by general formula (L-5) is preferably a compound selected from the group consisting of compounds represented by formula (L-5.5) to formula (L-5.7), for example, and is particularly preferably a compound represented by formula (L-5.7).

The preferable lower limit of the content of these compounds relative to the total amount of the composition of the present invention is 1%, 2%, 3%, 5%, or 7%. The preferable upper limit of the content of these compounds is 20%, 15%, 13%, 10%, or 9%.

[Chem. 76]

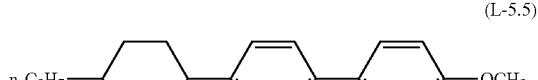
(L-5.5)

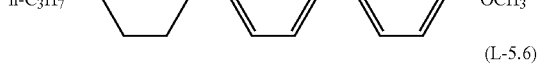
(L-5.6)

(L-5.7)

The compound represented by general formula (L-6) is the following compound.

[Chem. 77]

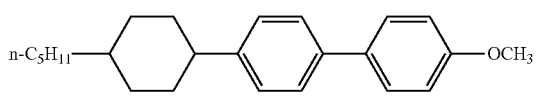
(L-6)

(In the formula, $R^{L61}$ and $R^{L62}$ are independently respectively the same as $R^{L1}$ and $R^{L2}$ in general formula (L) and $X^{L61}$ and $X^{L62}$ each independently represent a hydrogen atom or a fluorine atom.)

$R^{L61}$ and $R^{L62}$ preferably each independently represent an alkyl group having 1 to 5 carbon atoms and one of $X^{L61}$ and $X^{L62}$ preferably represents a fluorine atom and the other preferably represents a hydrogen atom.

The compounds represented by general formula (L-6) can be used alone or in combination. The number of compounds that can be used in combination is not particularly limited and is selected in accordance with the desired properties such as low-temperature solubility, transition temperature, electrical reliability, and birefringence. The number of compounds used is, for example, 1, 2, 3, 4, or 5 or more in one embodiment of the present invention.

The preferable lower limit of the compound represented by formula (L-6) relative to the total amount of the composition of the present invention is 1%, 2%, 3%, 5%, 7%, 10%, 14%, 16%, 20%, 23%, 26%, 30%, 35%, or 40%. The preferable upper limit of the content of the compound represented by formula (L-6) relative to the total amount of the composition of the present invention is 50%, 40%, 35%, 30%, 20%, 15%, 10%, or 5%. If increasing Δn is important, the content is preferably large and if precipitation at low temperature is important, the content is preferably small.

The compounds represented by general formula (L-6) are preferably compounds represented by formula (L-6.1) to formula (L-6.9).

[Chem. 78]

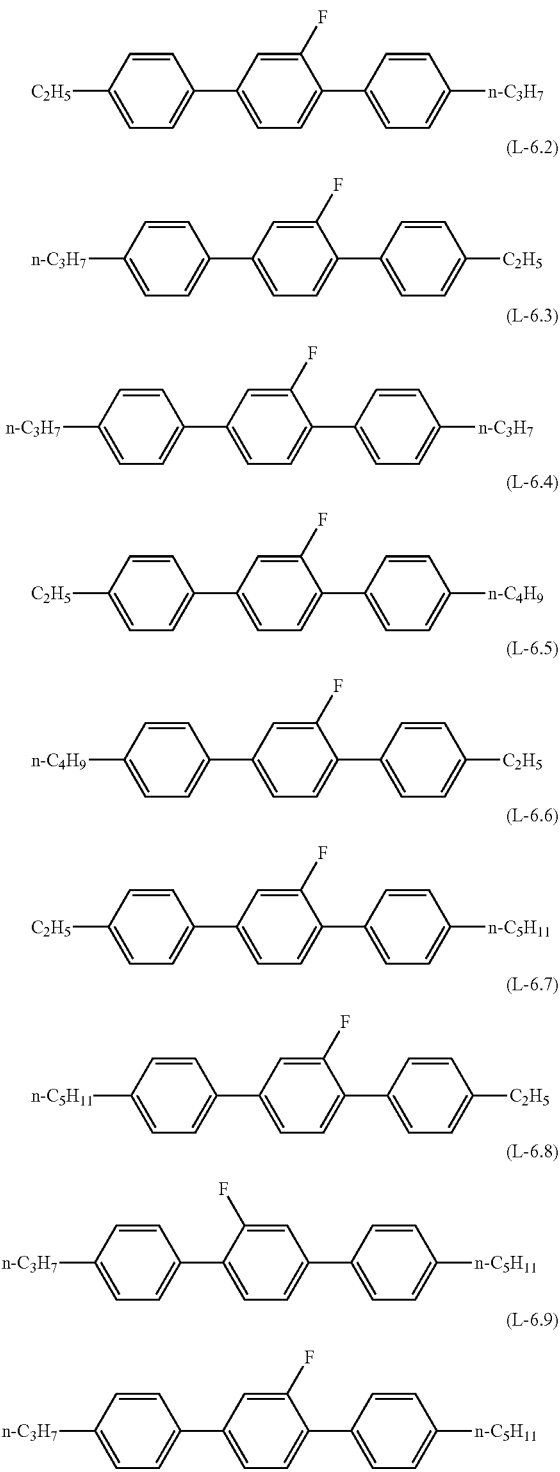

The number of compounds that can be used in combination is not particularly limited. One to three compounds are preferably selected from among these compounds, and one to four compounds are yet more preferably selected from among these compounds. Since it is effective to select compounds having a wide molecular weight distribution for improving solubility, for example, one selected from the compounds represented by formula (L-6.1) and formula (L-6.2), one selected from the compounds represented by formula (L-6.4) and formula (L-6.5), one selected from the compounds represented by formula (L-6.6) and formula (L-6.7), and one selected from the compounds represented by formula (L-6.8) and formula (L-6.9) may be appropriately used in combination. Among these, compounds represented by formula (L-6.1), formula (L-6.3), formula (L-6.4), formula (L-6.6), and formula (L-6.9) are preferably contained.

The compound represented by general formula (L-7) is the following compound.

[Chem. 79]

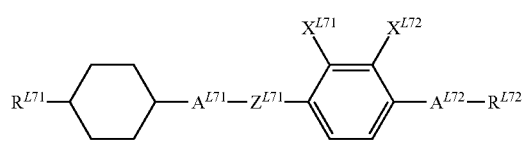

(In the formula, $R^{L71}$ and $R^{L72}$ are independently respectively the same as $R^{L1}$ and $R^{L2}$ in general formula (L), $A^{L71}$ and $A^{L72}$ are independently respectively the same as $A^{L2}$ and $A^{L3}$ in general formula (L), hydrogen atoms in $A^{L71}$ and $A^{L72}$ may each independently be substituted with a fluorine atom, $Z^{L71}$ is the same as $Z^{L2}$ in general formula (L), and $X^{L71}$ and $X^{L72}$ each independently represent a fluorine atom or a hydrogen atom.)

In the formula, $R^{L71}$ and $R^{L72}$ preferably each independently represent an alkyl group having 1 to 5 carbon atoms or an alkoxy group having 1 to 4 carbon atoms, $A^{L71}$ and $A^{L72}$ preferably each independently represent a 1,4-cyclohexylene group or a 1,4-phenylene group, hydrogen atoms in $A^{L71}$ and $A^{L72}$ may each independently be substituted with a fluorine atom, $Q^{L71}$ preferably represents a single bond or COO— or preferably represents a single bond, and $X^{L71}$ and $X^{L72}$ preferably each represent a hydrogen atom.

The number of compounds that can be used in combination is not particularly limited and is selected in accordance with the desired properties such as low-temperature solubility, transition temperature, electrical reliability, and birefringence. The number of compounds used is, for example, 1, 2, 3, or 4 in one embodiment of the present invention.

In the composition of the present invention, the content of the compound represented by general formula (L-7) must be appropriately adjusted in accordance with the desired properties, such as low-temperature solubility, transition temperature, electrical reliability, birefringence, process compatibility, drop marks, image-sticking, and dielectric anisotropy.

The preferable lower limit of the content of the compound represented by formula (L-7) relative to the total amount of the composition of the present invention is 1%, 2%, 3%, 5%, 7%, 10%, 14%, 16%, or 20%. The preferable upper limit of the content of the compound represented by formula (L-7) relative to the total amount of the composition of the present invention is 30%, 25%, 23%, 20%, 18%, 15%, 10%, or 5%.

If the composition of the present invention is to have high Tni, the content of the compound represented by formula (L-7) is preferably relatively high. If an embodiment with low viscosity is desirable, the content is preferably relatively low.

The compounds represented by general formula (L-7) are preferably compounds represented by formula (L-7.1) to formula (L-7.4), and a compound represented by formula (L-7.2) is preferable.

[Chem. 80]

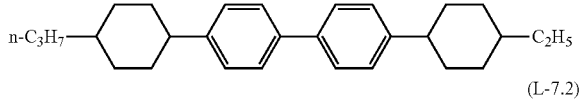
(L-7.1)

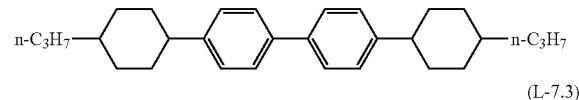
(L-7.2)

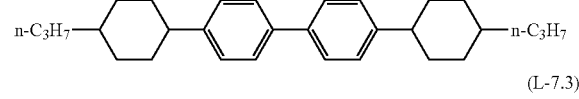
(L-7.3)

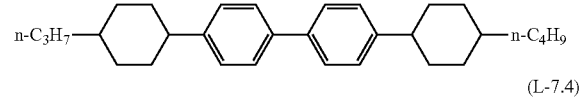
(L-7.4)

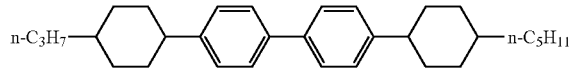

The compounds represented by general formula (L-7) are preferably compounds represented by formula (L-7.11) to formula (L-7.13), and a compound represented by formula (L-7.11) is preferable.

[Chem. 81]

(L-7.11)
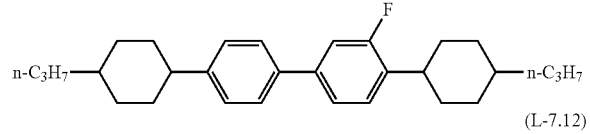

(L-7.12)
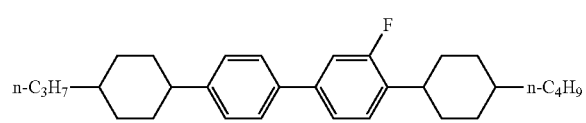

(L-7.13)
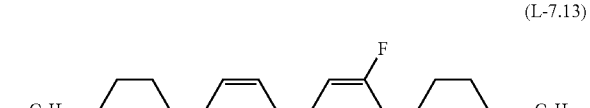

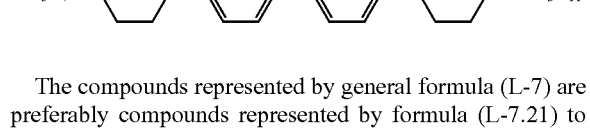

The compounds represented by general formula (L-7) are preferably compounds represented by formula (L-7.21) to formula (L-7.23) and a compound represented by formula (L-7.21) is preferable.

[Chem. 82]

(L-7.21)
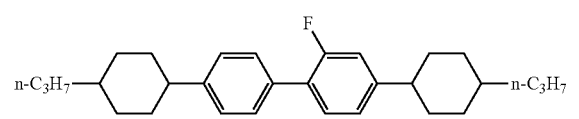

(L-7.22)
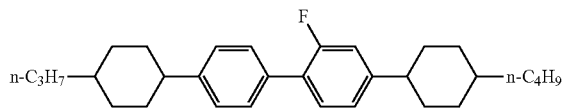

(L-7.23)
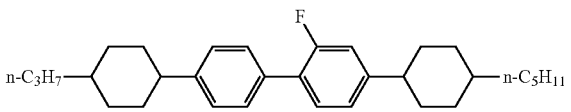

The compounds represented by general formula (L-7) are preferably compounds represented by formula (L-7.31) to formula (L-7.34), and a compound represented by formula (L-7.31) and/or formula (L-7.32) is preferable.

[Chem. 83]

(L-7.31)
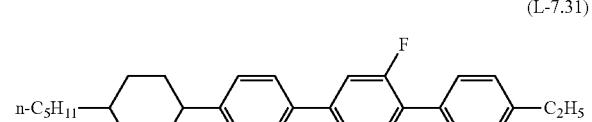

(L-7.32)
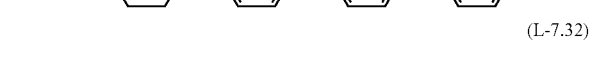

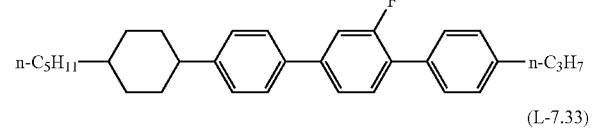
(L-7.33)

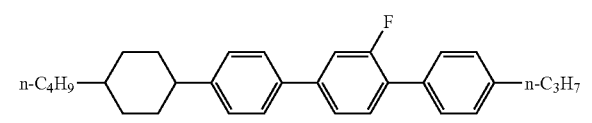
(L-7.34)

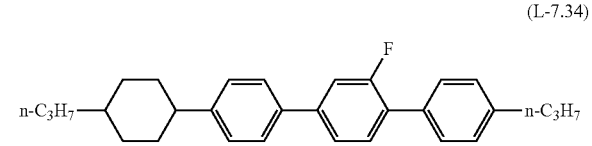

The compounds represented by general formula (L-7) are preferably compounds represented by formula (L-7.41) to formula (L-7.44), and a compound represented by formula (L-7.41) and/or formula (L-7.42) is preferable.

[Chem. 84]

(L-7.41)
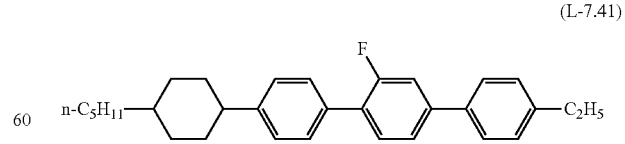

(L-7.42)
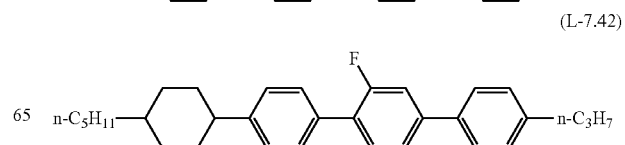

-continued (L-7.43)

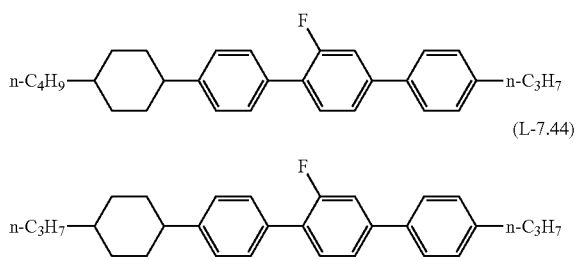

(L-7.44)

The preferable lower limit of the total content of the compound selected from the group consisting of compounds represented by general formulae (i) and (ii) and the compounds represented by general formulae (L) and (M) relative to the total amount of the composition of the present invention is 80%, 85%, 88%, 90%, 92%, 93%, 94%, 95%, 96%, 97%, 98%, 99%, or 100%. The preferable upper limit of the content is 100%, 99%, 98%, or 95%.

The preferable lower limit of the total content of the compounds represented by general formula (i), general formula (ii), and general formulae (L-1) to (L-7) and (M-1) to (M-8) relative to the total amount of the composition of the present invention is 80%, 85%, 88%, 90%, 92%, 93%, 94%, 95%, 96%, 97%, 98%, 99%, or 100%. The preferable upper limit is 100%, 99%, 98%, or 95%.

The composition of the invention of the subject application preferably contains no compounds having a structure in which oxygen atoms are bonded to each other, such as a peroxide (—CO—OO—) structure, in its molecule.

If reliability and long-term stability of the composition are important, the content of the compound having a carbonyl group is preferably adjusted to 5% or less relative to the total mass of the composition, more preferably 3% or less, yet more preferably 1% or less, and most preferably substantially zero.

If stability under UV radiation is important, the content of the compound having a chlorine atom substituted therein is preferably adjusted to 15% or less, preferably 10% or less, preferably 8% or less, preferably 5% or less, preferably 3% or less, and more preferably substantially zero relative to the total mass of the composition.

The content of the compound in which all ring structures in the molecule are six-membered is preferably high. The content of the compound in which all ring structures in the molecule are six-membered is preferably 80% or more, more preferably 90% or more, and more preferably 95% or more relative to the total mass of the composition. Most preferably, the composition is made up from only those compounds in which substantially all ring structures in the molecule are six-membered.

In order to suppress degradation of the composition by oxidation, the content of the compound having a cyclohexenylene group as a ring structure is preferably low. The content of the compound having a cyclohexenylene group relative to the total mass of the composition is preferably 10% or less, preferably 8% or less, more preferably 5% or less, preferably 3% or less, and yet more preferably substantially zero.

If improving viscosity and Tni is important, the content of the compound intramolecularly having a 2-methylbenzene-1,4-diyl group having a hydrogen atom which may be substituted with a halogen is preferably low. The content of the compound intramolecularly having a 2-methylbenzene-1,4-diyl group relative to the total mass of the composition is preferably 10% or less, preferably 8% or less, preferably 5% or less, preferably 3% or less, more preferably substantially zero.

For the purposes of this application, substantially zero means that the substance concerned is not contained except for those unintentionally mixed.

When a compound contained in the composition of the present invention has an alkenyl group as a side chain and the alkenyl group is bonded to cyclohexane, the number of carbon atoms of that alkenyl group is preferably 2 to 5. When the alkenyl group is bonded to benzene, the number of carbon atoms of the alkenyl group is preferably 4 or 5, and the unsaturated bond of the alkenyl group is preferably not directly bonded to benzene.

The composition of the present invention can contain a polymerizable compound in order to prepare a PS-mode, a horizontal-field-type PSA mode, or horizontal-field-type PSVA mode liquid crystal display device. Examples of the polymerizable compound that can be used include photopolymerizable monomers whose polymerization proceeds under an energy ray such as light, and polymerizable compounds that have a liquid crystal skeleton in which plural six-membered rings are connected to each other, such as a biphenyl derivative or a terphenyl derivative. Specifically, difunctional monomers represented by general formula (XX) are preferable:

[Chem. 85]

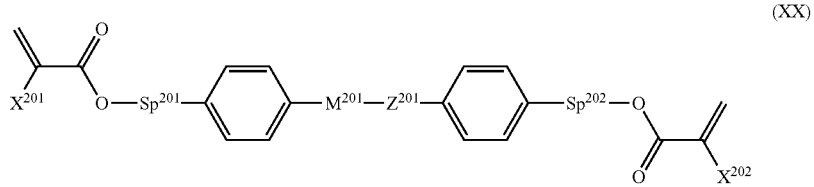

(XX)

(In the formula, $X^{201}$ and $X^{202}$ each independently represent a hydrogen atom or a methyl group, $Sp^{201}$ and $Sp^{202}$ preferably each independently represent a single bond, an alkylene group having 1 to 8 carbon atoms, or —O—$(CH_2)_s$— (in the formula, s represents an integer of 2 to 7 and the oxygen bond is to bond to the aromatic ring.)

$Z^{201}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (In the formula, $Y^1$ and $Y^2$ each indepen- 'dently represent a fluorine atom or a hydrogen atom), —C≡C—, or a single bond, and $M^{201}$ represents a 1,4-phenylene group, a trans-1,4-cyclohexylene group, or a single bond, where all 1,4-phenylene groups in the formula may have any hydrogen atom substituted with a fluorine atom.).

A diacrylate derivative in which $X^{201}$ and $X^{202}$ both represent a hydrogen atom and a dimethacrylate derivative in which both represent a methyl group are equally preferable. A compound in which one of $X^{201}$ and $X^{202}$ represents a hydrogen atom and the other represents a methyl group is also preferable. As for the polymerization rates of these compounds, the diacrylate derivative is the fastest, the methacrylate derivative is the slowest, and the asymmetric compound is in the middle. A preferable mode may be employed depending on the usage. For a PSA display device, a dimethacrylate derivative is particularly preferable.

$Sp^{201}$ and $Sp^{202}$ each independently represent a single bond, an alkylene group having 1 to 8 carbon atoms, or —O—$(CH_2)_s$—. For a PSA display device, at least one of the two preferably represents a single bond. A compound in which both represent a single bond and an embodiment in which one represents a single bond and the other represents an alkylene group having 1 to 8 carbon atoms or —O—$(CH_2)_s$— are preferable. In this case, an alkyl group having 1 to 4 carbon atoms is preferable and s is preferably 1 to 4.

$Z^{201}$ preferably represents —OCH$_2$—, —CH$_2$O—, —COO—, —OCO—, —CF$_2$O—, —OCF$_2$—, —CH$_2$CH$_2$—, —CF$_2$CF$_2$—, or a single bond, more preferably represents —COO—, —OCO—, or a single bond, and most preferably represents a single bond.

$M^{201}$ represents a 1,4-phenylene group which may have any hydrogen atom substituted with a fluorine atom, a trans-1,4-cyclohexylene group, or a single bond, and preferably represents a 1,4-phenylene group or a single bond. When C represents a ring structure and not a single bond, $Z^{201}$ is preferably a linking group other than a single bond. When $M^{201}$ represents a single bond, $Z^{201}$ preferably represents a single bond.

In view of the above, the ring structure between $Sp^{201}$ and $Sp^{202}$ in general formula (XX) is preferably any one of the structures specifically described below.

When $M^{201}$ represents a single bond and the ring structure is constituted by two rings in general formula (XX), preferable ring structures are those represented by formula (XXa-1) to formula (XXa-5), more preferable are formula (XXa-1) to formula (XXa-3), and most preferable is formula (XXa-1).

[Chem. 86]

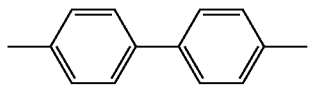

(XXa-1)

[Chem. 87]

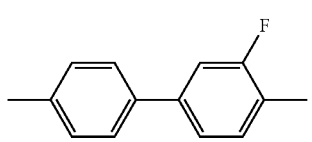

(XXa-2)

[Chem. 88]

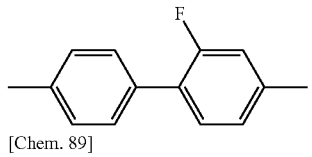

(XXa-3)

[Chem. 89]

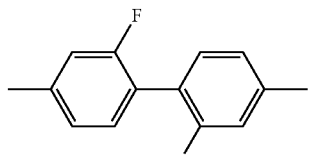

(XXa-4)

[Chem. 90]

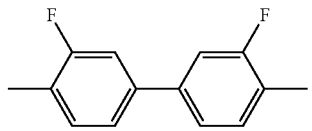

(XXa-5)

(In the formula, each of the two ends bonds to $Sp^{201}$ or $Sp^{202}$.)

Polymerizable compounds containing these skeletons exhibit optimum anchoring force for PSA-mode liquid crystal display devices after polymerization, and excellent orientation state is obtained. Thus, display nonuniformity is suppressed or completely prevented.

In view of the above, compounds represented by general formula (XX-1) to general formula (XX-4) are preferable as the polymerizable monomer. Among these, a compound represented by general formula (XX-2) is most preferable.

[Chem. 91]

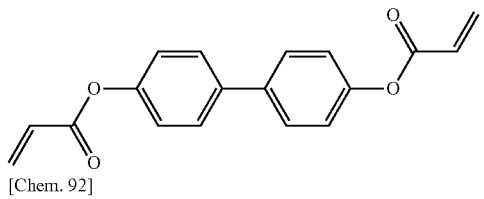

(XX-1)

[Chem. 92]

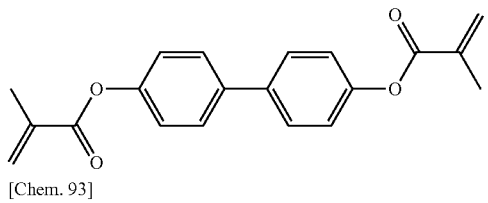

(XX-2)

[Chem. 93]

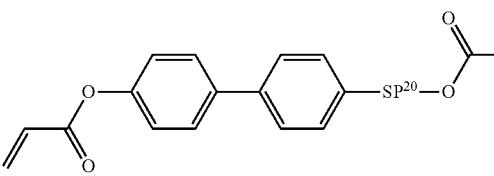

(XX-3)

[Chem. 94]

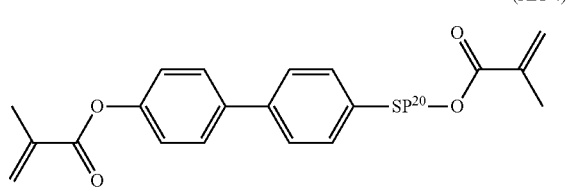

(XX-4)

(In the formula, $Sp^{20}$ represents an alkylene group having 2 to 5 carbon atoms.)

When a monomer is to be added to the composition of the present invention, polymerization proceeds in the absence of a polymerization initiator. However, a polymerization initiator may be contained in order to accelerate polymerization. Examples of the polymerization initiator include benzoin ethers, benzophenones, acetophenones, benzyl ketals, and acylphosphine oxides.

The composition containing a polymerizable compound of the present invention is given a liquid crystal aligning ability when the polymerizable compound contained therein is polymerized by UV irradiation, and used in a liquid crystal display device that controls the quantity of transmitted light by using birefringence of the composition. The composition is suitable for use in liquid crystal display devices such as active matrix liquid crystal displays (AM-LCD), twisted nematic (TN) liquid crystal displays, super twisted nematic liquid crystal displays (STN-LCD), OCB-LCD, and in-plane-switching liquid crystal displays (IPS-LCD). The composition is particularly useful for AM-LCD, and can be used in a transmission-type or reflective-type liquid crystal display device.

Two substrates of a liquid crystal cell used in a liquid crystal display device can be formed by using a flexible and transparent material such as a plastic or glass. One of the substrates may be formed of an opaque material such as silicon. A transparent substrate having a transparent electrode layer can be obtained by, for example, sputtering indium tin oxide (ITO) onto a transparent substrate such as a glass plate.

A color filter can be prepared by, for example, a pigment dispersion method, a printing method, an electrodeposition method, or a dyeing method. For example, according to a method for preparing a color filter by a pigment dispersion method, a curable coloring composition for forming a color filter is applied onto a transparent substrate, and the applied composition is patterned, followed by curing under heating or irradiation with light. This process is conducted for each of three colors, namely, red, green, and blue, so as to form pixel portions of a color filter. Pixel electrodes including active devices such as TFTs, thin-film diodes, and metal-insulator-metal resistive elements may be disposed on the substrate.

The substrates are arranged to oppose each other with transparent electrode layers facing inward. During this process, the space between the substrates may be adjusted by using spacers. In this case, the adjustment is preferably made so that the light-adjustment layer obtained thereby has a thickness of 1 to 100 µm. More preferable is 1.5 to 10 µm. When a polarizing plate is used, the product of the refractive index anisotropy Δn of the liquid crystal and the cell thickness d is preferably adjusted so that a maximum contrast is obtained. When two polarizing plates are provided, the polarization axis of each polarizing plate can be adjusted to improve viewing angle and contrast. Retarder films for widening the viewing angle can also be used. Examples of the spacers include glass particles, plastic particles, alumina particles, and columnar spacers composed of a photoresist material. Then a sealing agent such as an epoxy-based thermosetting composition is screen-printed onto the substrate while securing a liquid crystal inlet port, the substrates are bonded to each other, and heating is performed to thermally cure the sealing agent.

A common vacuum injection method or ODF method can be used to place a polymerizable-compound-containing liquid crystal composition in a gap between the two substrates, for example. However, the vacuum injection method has a problem in that, although drop marks do not occur, trace of injection remains. The invention of the subject application is more suitable for use in making a display device by an ODF method. In a liquid crystal display device manufacturing process by an ODF method, a sealing material such as an epoxy-based photothermal dual curing sealing material is applied to one of a backplane substrate or a frontplane substrate by using a dispenser so as to form a closed-loop bank, a particular amount of the liquid crystal composition is placed dropwise in the space defined by the bank while performing evacuation, and the frontplane and the backplane are bonded to each other to manufacture a liquid crystal display device. The liquid crystal composition of the present invention is favorable since dropping of the liquid crystal composition during the ODF step can be performed stably.

In order to a satisfactorily align the liquid crystal, an appropriate polymerization speed is desirable. Thus, the method for polymerizing the polymerizable compounds preferably involves irradiating the liquid crystal composition with an active energy ray such as an ultraviolet ray or an electron beam or with two or more active energy rays either simultaneously or sequentially. In the case where ultraviolet rays are used, a polarized light source may be used or unpolarized light source may be used. In the case where polymerization is performed while holding the polymerizable-compound-containing composition between the two substrates, at least the substrate on the incident side must have an appropriate degree of transparency for the active energy ray used. Moreover, after only a particular portion is polymerized by using a mask during irradiation, the alignment state of the unpolymerized portion may be changed by changing the conditions such as electric field, magnetic field, or temperature and then an active energy ray may be applied again to perform polymerization. In particular, when the composition is exposed with an UV ray, UV exposure is preferably performed while applying an AC electric field to the polymerizable-compound-containing composition. The AC electric field applied is preferably an AC having a frequency of 10 Hz to 10 kHz and more preferably an AC having a frequency of 60 Hz to 10 kHz, and the voltage is selected depending on the desired pretilt angle of the liquid crystal display device. In other words, the pretilt angle of the liquid crystal display device can be controlled by the applied voltage. For a horizontal electric field-type MVA-mode liquid crystal display device, the pretilt angle is preferably controlled to 80° to 89.9° from the viewpoints of alignment stability and contrast.

The temperature during irradiation is preferably within a temperature range in which the composition of the present invention retains a liquid crystal state. Polymerization is preferably conducted at a temperature near room temperature, that is, typically a temperature in a range of 15 to 35° C. The lamp that generates UV rays may be a metal halide lamp, a high-pressure mercury lamp, an ultra-high-pressure mercury lamp, or the like. The wavelength of the UV ray applied is preferably in the wavelength region outside the absorption wavelength region of the composition and, if needed, some portions of the UV rays may be cut. The intensity of the ultraviolet ray applied is preferably 0.1 mW/cm$^2$ to 100 W/cm$^2$ and more preferably 2 mW/cm$^2$ to 50 W/cm$^2$. The amount of energy of the ultraviolet ray applied can be appropriately adjusted but is preferably 10 mJ/cm$^2$ to 500 J/cm$^2$ and more preferably 100 mJ/cm$^2$ to 200 J/cm$^2$. The intensity may be varied during irradiation with UV rays. The amount of time for which the UV ray is applied is appropriately selected depending on the intensity of the UV ray applied but is preferably 10 to 3600 seconds and more preferably 10 to 600 seconds.

A liquid crystal display device that uses the composition of the present invention is useful since high-speed response and suppressed display failures are both achieved, and is particularly useful for use in active matrix driving liquid crystal display devices, in particular, liquid crystal display devices of VA mode, PSVA mode, PSA mode, IPS mode, or ECB mode.

EXAMPLES

The present invention will now be described in further detail by using Examples below which do not limit the scope of the present invention. In the compositions of Examples and Comparative Examples below, "%" means "% by mass".

The properties that were measured in examples are as follows.

$T_{ni}$: nematic phase-isotropic liquid phase transition temperature (° C.)

Δn: refractive index anisotropy at 298 K

Δε: dielectric anisotropy at 298 K

η: viscosity (mPa·s) at 293 K $γ_1$: rotational viscosity (mPa·s) at 298 K

VHR: voltage holding ratio (%) at a frequency of 60 Hz and an applied voltage of 5 V at 333 K VHR: voltage holding ratio (%) at a frequency of 60 Hz and an applied voltage of 1 V at 60° C.

VHR after 1000 h: voltage holding ratio (%) at a frequency of 60 Hz and an applied voltage of 1 V at 60° C. after being left in a 90° C. high-temperature state for 1000 hours Image-Sticking:

Evaluation of image-sticking in liquid crystal display devices was conducted as follows. A predetermined fixed pattern was displayed in a display area for a particular test time period, and then uniform display was conducted in all parts of the screen. The test time taken for the afterimage of the fixed pattern to reach an acceptable afterimage level was measured.

1) The "test time" here refers to the period of time the fixed pattern was displayed. The longer the test time, the more suppressed the occurrence of the afterimage and the higher the performance.

2) The "unacceptable afterimage level" refers to the level at which an afterimage rated as fail in pass/fail assessment for shipping was observed.

Examples

Sample A: 1000 hours

Sample B: 500 hours

Sample C: 200 hours

Sample D: 100 hours

The level of performance: A>B>C>D

Drop Marks:

Drop marks in liquid crystal display devices were evaluated on the following five-grade scale by observing white drop marks on a black display of the entire screen with naked eye.

5: No drop marks (excellent)

4: Drop marks were barely perceptible and were at an acceptable level (good)

3: Drop marks were slightly perceptible and were at a borderline level of pass/fail assessment (pass with conditions)

2: Drop marks were present and were at an unacceptable level (fail)

1: Drop marks were extensive (poor)

Process Compatibility:

The process compatibility was evaluated through an ODF process as follows. The liquid crystal was dropped 50 pL at a time by using a pump, and the total mass of the liquid crystal dropped in 100 dropping operations, i.e., a total in 0 to 100th dropping operations, 101st to 200th dropping operations, 201st to 300th dropping operations, and so on, was measured. The number of times dropping was conducted until the variation in mass was so large that the ODF process could no longer be carried out was used as the basis for evaluation.

A large number of times of dropping means that the liquid crystal can be stably dropped over a long period of time and that the process compatibility is high.

Example

Sample A: 95000 times

Sample B: 40000 times

Sample C: 100000 times

Sample D: 10000 times

The level of performance: C>A>B>D

Low-Temperature Solubility:

Low-temperature solubility was evaluated as follows. After preparation of a composition, 1 g of the composition was weighed into a 2 mL sample jar and exposed continuously to temperature change cycles in a temperature-controlled test chamber, each cycle involving the following operation conditions: −20° C. (retained for 1 hour)→9 heating (0.1° C./min)→0° C. (retained for 1 hour)→9 heating (0.1° C./min)→20° C. (retained for 1 hour)→cooling (−0.1° C./min)→0° C. (retained for 1 hour)→cooling (−0.1° C./min)→−20° C. Occurrence of precipitates from the composition was observed with naked eye and the test time taken until precipitates were observed was measured.

A long test time indicates stable retention of the liquid crystal phase over a long period of time and good low-temperature solubility.

Example

Sample A: 72 hours
Sample B: 600 hours
Sample C: 384 hours
Sample D: 1440 hours
The level of performance: D>B>C>A
Volatility/Production Facility Contamination Property Volatility of the liquid crystal material was evaluated by visually confirming foaming of the liquid crystal material while monitoring the operation state of a vacuum stirring defoaming mixer with a stroboscope. Specifically, 0.8 kg of a composition was placed in a 2.0 L special container of a vacuum stirring defoaming mixer and the vacuum stirring defoaming mixer was driven at a revolution velocity of 15 $S^{-1}$ and a rotating velocity of 7.5 $S^{-1}$ under evacuation of 4 kPa. The time taken until foaming started was measured.

A longer time taken for foaming to start indicates a low possibility of contaminating production facility and thus high performance.

Example

Sample A: 200 sec
Sample B: 45 sec
Sample C: 60 sec
Sample D: 15 sec
The level of performance: A>C>B>D In Examples, following abbreviations are used in describing compounds.
(Ring Structure)

[Chem. 95]

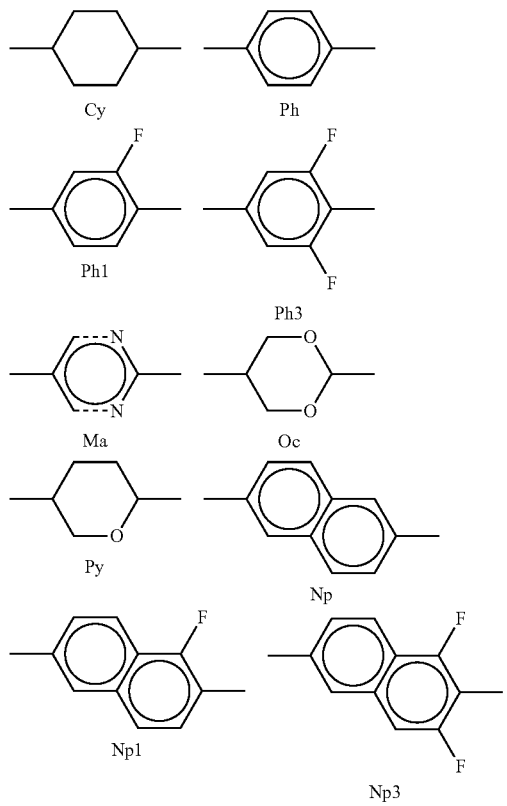

(Side Chain Structure and Linking Structure)

TABLE 1

| n (numeral) at terminal | $C_nH_{2n+1}$— |
|---|---|
| -ndOFF- | —$(CH_2)_{n-1}$—HC=CFF |
| -2- | —$CH_2CH_2$— |
| -1O- | —$CH_2O$— |
| -O1- | —$OCH_2$— |
| -V- | —CO— |
| -VO- | —COO— |
| -CFFO- | —$CF_2O$— |
| -F | —F |
| -Cl | —Cl |
| -OCFFF | —$OCF_3$ |
| -CFFF | —$CF_3$ |
| -On | —$OC_nH_{2n+1}$ |
| ndm- | $C_nH_{2n+1}$—HC=CH—$(CH_2)_{m-1}$— |
| -ndm | —$(CH_2)_{n-1}$—HC=CH—$(CH_2)_m$- |
| -Ondm | —O—$(CH_2)_{n-1}$—HC=CH— |
| -ndm- | —$(CH_2)_{n-1}$—HC=CH—$(CH_2)_{m-1}$ |
| -CN | —C≡N |
| -T- | —C≡C— |

Examples 1 and 2 and Comparative Examples 1 to 4

The following compositions were prepared.

TABLE 2

|  | Composition A1 | Composition A2 |
|---|---|---|
| (i-1-2.2) | 35 |  |
| (i-2.1) | 5 |  |
| (M-2.3) | 5 | 5 |
| (M-8.12) | 10 | 10 |
| (M-3.2) | 10 | 10 |
| (M-2.5) | 10 | 10 |
| (M-5.2) | 5 | 5 |
| (M7.12) | 5 | 5 |
| (M-1.2) | 10 | 10 |
| (L-7.2) | 5 | 5 |
| (L-1-3.1) |  | 35 |
| (L-4.9) |  | 5 |

TABLE 3

|  | Composition B1 | Composition B2 |
|---|---|---|
| (i-1-2.2) | 20 |  |
| (i-1-1.3) | 3 |  |
| (i-2.1) | 12 |  |
| (ii-1.11) | 10 |  |
| (M-5.23) | 10 | 10 |
| (M-2.3) | 5 | 5 |
| (M-2.5) | 7 | 7 |
| (M-6.22) | 15 | 15 |
| (M-1.2) | 15 | 15 |
| (M-8.12) | 3 | 3 |
| (L-1-3.1) |  | 23 |
| (L-4.9) |  | 12 |
| (L-6.4) |  | 10 |

To each of the compositions prepared, a compound represented by formula (iii-2.2) was added to prepare Examples 1 and 2 and Comparative Examples 1 to 4. The physical properties of these compositions are shown below.

TABLE 4

|  | Example 1 | Comparative Example 1 | Comparative Example 2 |
|---|---|---|---|
| Composition | Composition A1 | Composition A2 | Composition A1 100 |
| Content (%) | 99.97 | 99.97 |  |
| Formula (III-2.2) | 0.03 | 0.03 | — |
| Content (%) |  |  |  |
| Tni | 90.2 | 86.2 |  |
| $\Delta n$ | 0.099 | 0.092 |  |
| $\Delta \varepsilon$ | 10.0 | 10.1 |  |
| $\eta$ | 17.3 | 19.5 |  |
| $\gamma 1$ | 82 | 96 |  |
| $\gamma 1/\Delta n^2$ | 8.3 | 11.3 |  |
| VHR | 99.4 | 99.3 | 99.5 |
| VHR after 1000 h | 98.3 | 98.2 | 95.8 |

TABLE 5

|  | Example 2 | Comparative Example 3 | Comparative Example 4 |
|---|---|---|---|
| Composition | Composition B1 | Composition B2 | Composition B1 100 |
| Content (%) | 99.97 | 99.97 |  |
| Formula (III-2.2) | 0.03 | 0.03 | — |
| Content (%) |  |  |  |
| Tni | 81.1 | 75.9 |  |
| $\Delta n$ | 0.108 | 0.098 |  |
| $\Delta \varepsilon$ | 8.9 | 10.0 |  |
| $\gamma 1$ | 67 | 77 |  |
| $\gamma 1/\Delta n^2$ | 5.8 | 8.0 |  |
| VHR | 99.3 | 99.3 | 99.5 |
| VHR after 1000 h | 98.1 | 98.3 | 96.1 |

The compositions of Examples 1 and 2 are each a composition that contains 99.97% of the composition described above and 0.03% of the compound represented by formula (iii-2.2) serving as a compound represented by general formula (ii).

The compositions of Examples 1 and 2 contain compounds represented by general formulae (i) and (iii). In Comparative Examples 1 and 3, the compound represented by general formula (i) is replaced by a similar compound.

Examples and Comparative Examples show that the compositions according to the subject applications have excellent $\eta$ and $\gamma 1$.

In Comparative Examples 2 and 4, the compound represented by general formula (iii) is not contained. It was found that the VHR after 1000 h, which was longer than the time of evaluation for normal VHR, was excellent.

Examples 3 to 5

Examples 3 to 5 were prepared by adding the compound represented by formula (iii-2.2) to the composition described below so that the content of the compound was 0.03%.

TABLE 6

|  | Example 3 | Example 4 | Example 5 |
|---|---|---|---|
| Tni | 72.5 | 75.4 | 76.2 |
| $\Delta n$ | 0.111 | 0.098 | 0.099 |
| $\Delta \varepsilon$ | 5.4 | 3.2 | 3.2 |
| $\gamma 1$ | 62 | 54 | 53 |
| $\gamma 1/\Delta n^2$ | 5.0 | 5.7 | 5.5 |
| (i-1-2.2) | 40 | 45 | 50 |
| (i-1-1.3) | 15 | 15 | 15 |
| (ii-1.13) | 5 | 5 | 5 |
| (i-2.1) | 7 | 7 | 7 |
| (i-2.2) | 7 | 7 | 7 |
| (L-1-3.1) |  | 5 |  |
| (L-6.1) | 5 | 5 | 5 |
| (M-8.52) | 3 | 1 | 1 |
| (M-1.2) | 8 |  |  |
| (M-4.2) | 5 | 5 | 5 |
| (M-3.2) | 5 | 5 | 5 |

TABLE 7

|  | Example 3 | Example 4 | Example 5 |
|---|---|---|---|
| Tni | 72.5 | 75.4 | 76.2 |
| $\Delta n$ | 0.111 | 0.098 | 0.099 |
| $\Delta \varepsilon$ | 5.4 | 3.2 | 3.2 |
| $\gamma 1$ | 62 | 54 | 53 |
| $\gamma 1/\Delta n^2$ | 5.0 | 5.7 | 5.5 |
| VHR | 99.5 | 99.2 | 99.2 |
| VHR after 1000 h | 98.1 | 98.2 | 98.3 |

Examples 6 to 8

Examples 6 to 8 were prepared by adding the compound represented by formula (iii-1.2) to the composition described below so that the content of the compound was 0.03%.

|  | Example 6 | Example 7 | Example 8 |
|---|---|---|---|
| (i-1-2.2) | 35 | 40 | 45 |
| (i-1-1.3) | 10 | 8 | 8 |
| (ii-1.13) | 10 | 8 | 8 |
| (i-2.1) | 10 | 9 | 8 |
| (L-6.1) | 3 | 3 | 3 |
| (L-6.4) | 5 | 5 | 4 |
| (ii-2.11) | 5 | 5 | 4 |
| (M-1.2) | 5 | 5 | 4 |
| (M-8.32) | 5 | 5 | 4 |
| (M-8.52) | 1 | 1 | 1 |
| (M-4.2) | 5 | 5 | 5 |
| (M-3.2) | 6 | 6 | 6 |

TABLE 8

|  | Example 6 | Example 7 | Example 8 |
|---|---|---|---|
| Tni | 80.1 | 79.6 | 77.0 |
| $\Delta n$ | 0.125 | 0.121 | 0.114 |
| $\Delta \varepsilon$ | 6.3 | 6.3 | 5.7 |
| $\eta$ | 14.2 | 13.3 | 11.1 |
| $\gamma 1$ | 62 | 57 | 50 |
| $\gamma 1/\Delta n^2$ | 4.0 | 3.9 | 3.8 |
| VHR | 99.2 | 99.4 | 99.3 |
| VHR after 1000 h | 98.4 | 98.4 | 98.3 |

Examples 9 to 11

Examples 9 to 11 were prepared by adding the compound represented by formula (iii-2.2) to the composition described below so that the content of the compound was 0.03%.

TABLE 9

|  | Example 9 | Example 10 | Example 11 |
|---|---|---|---|
| (i-1-2.2) | 30 | 40 | 50 |
| (i-1-1.3) | 10 | 5 | 5 |
| (i-2.1) | 10 | 10 | 10 |
| (ii-2.14) | 3 | 5 | 5 |
| (M-1.2) | 15 | 15 | 5 |
| (M-4.2) | 5 | 5 | 5 |
| (M-4.3) | 7 | 5 | 5 |
| (M-4.4) | 5 | 5 | 5 |
| (M-3.1) | 5 | 5 | 5 |
| (M-3.2) | 5 | 5 | 5 |
| (M-6.32) | 5 | | |

TABLE 10

|  | Example 9 | Example 10 | Example 11 |
|---|---|---|---|
| Tni | 76.9 | 77 | 83.7 |
| Δn | 0.117 | 0.109 | 0.099 |
| Δε | 14.3 | 11.1 | 7.0 |
| η | 16.6 | 12.1 | 7.9 |
| γ1 | 107 | 74 | 70 |
| γ1/Δn² | 7.9 | 6.3 | 7.2 |
| VHR | 99.3 | 99.3 | 99.4 |
| VHR after 1000 h | 98.1 | 98.1 | 98.2 |

Examples 12 to 14

Examples 9 to 11 were prepared by adding the compound represented by formula (iii-2.2) to the composition described below so that the content of the compound was 0.03%.

TABLE 11

|  | Example 12 | Example 13 | Example 14 |
|---|---|---|---|
| (i-1-2.2) | 10 | 15 | 20 |
| (i-1-1.3) | 10 | 10 | 8 |
| (i-1-2.3) | 5 | 5 | 5 |
| (i-1-2.4) | 20 | 15 | 15 |
| (i-2.1) | 5 | 5 | 3 |
| (i-2.2) | 5 | 5 | 3 |
| (L-7.31) | 5 | 5 | 5 |
| (L-7.32) | 5 | 5 | 5 |
| (M-1.1) | 5 | 5 | 5 |
| (M-1.2) | 5 | 5 | 5 |
| (M-4.2) | 5 | 5 | 5 |
| (M-3.2) | 5 | 5 | 5 |
| (M-6.22) | 10 | 10 | 10 |
| (M-8.2) | 2 | 2 | 3 |
| (M-8.12) | 3 | 3 | 3 |

TABLE 12

|  | Example 12 | Example 13 | Example 14 |
|---|---|---|---|
| Tni | 92.7 | 92.1 | 89.1 |
| Δn | 0.118 | 0.117 | 0.115 |
| Δε | 9.4 | 9.5 | 9.8 |
| η | 22.4 | 21.2 | 20.0 |
| γ1 | 147 | 136 | 127 |
| γ1/Δn² | 10.5 | 9.9 | 9.6 |
| VHR | 99.4 | 99.1 | 99.2 |
| VHR after 1000 h | 98.3 | 97.9 | 98.3 |

The evaluation of the compositions of Examples 1, 2, 3, 6, 9, and 12 are shown below.

TABLE 13

|  | Example 1 | Example 2 | Example 3 |
|---|---|---|---|
| Image-sticking | A | A | A |
| Drop marks | 5 | 5 | 5 |
| Process compatibility | C | C | C |
| Low-temperature solubility | D | D | D |
| Volatility/production facility contamination property | A | A | A |

TABLE 14

|  | Example 6 | Example 9 | Example 12 |
|---|---|---|---|
| Image-sticking | A | A | A |
| Drop marks | 5 | 5 | 5 |
| Process compatibility | C | C | C |
| Low-temperature solubility | D | D | D |
| Volatility/production facility contamination property | A | A | A |

Similar results are obtained from the compositions of other Examples. This shows that the composition according to the subject application is practically acceptable.

The invention claimed is:

1. A composition having a positive dielectric anisotropy, the composition comprising:
    at least one selected from the group consisting of compounds represented by general formulae (i) and (ii); and
    at least one selected from compounds represented by general formula (iii):

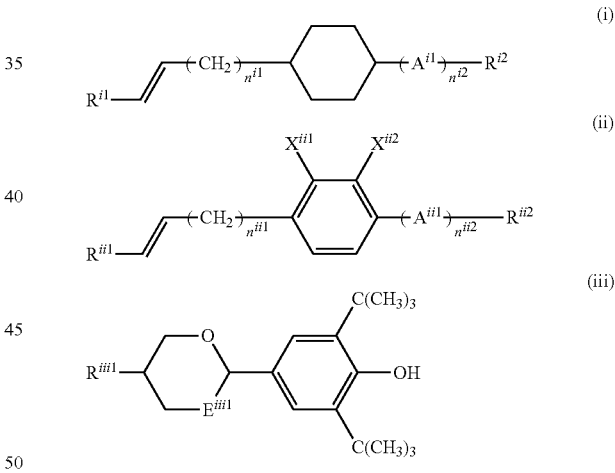

(In the formulae, $R^{i1}$, $R^{ii1}$, and $R^{iii1}$ each independently represent a hydrogen atom or an alkyl group having 1 to 8 carbon atoms, one —CH$_2$— or two or more nonadjacent —CH$_2$— in the alkyl group may each independently be substituted with —CH=CH—, —C≡C—, —O—, —CO—, —COO—, or —OCO—, $n^{i1}$ and $n^{ii1}$ each represent an integer of 0 to 8, $n^{i2}$ and $n^{ii2}$ each represent an integer of 1 to 4, $A^{i1}$ and $A^{ii1}$ each independently represent a group selected from the group consisting of (a) a 1,4-cyclohexylene group (one —CH$_2$— or two or more nonadjacent —CH$_2$— in this group may each be substituted with —O—) and (b) a 1,4-phenylene group (one —CH= or two or more nonadjacent —CH= in this group may each be substituted with —N=), the group (a) and the group (b) may each independently be substituted with a cyano group, a fluorine atom, or a chlorine atom but when two or more $A^{ii1}$ and/or $A^{ii1}$ are present, they may be the same or different, $E^{iii1}$ represents —O— or —CH$_2$—, $X^{ii1}$ and $X^{ii2}$ each independently represent a hydrogen atom or a halogen, and $R^{i2}$ and $R^{ii2}$ each independently represent an alkyl group having 1 to 8 carbon atoms and one —CH$_2$— or two or more nonadjacent —CH$_2$— in the alkyl group may each independently be substituted with —CH=CH—, —C≡C—, —O—, —CO—, —COO—, or —OCO—).

2. The composition according to claim 1, further comprising at least one compound represented by general formula (M):

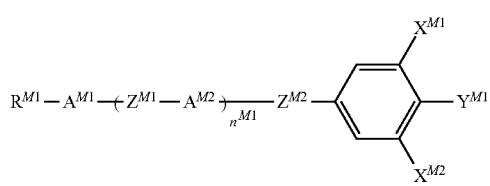

(M)

(In the formula, $R^{M1}$ represents an alkyl group having 1 to 8 carbon atoms and one —CH$_2$— or two or more nonadjacent —CH$_2$— in the alkyl group may each independently be substituted with —CH=CH—, —C≡C—, —O—, —CO—, —COO—, or —OCO—, $n^{M1}$ represents 0, 1, 2, 3, or 4, $A^{M1}$ and $A^{M2}$ each independently represent a group selected from the group consisting of (a) a 1,4-cyclohexylene group (one —CH$_2$— or two or more nonadjacent —CH$_2$— in this group may each be substituted with —O— or —S—) and (b) a 1,4-phenylene group (one —CH= or two or more nonadjacent —CH= in this group may each be substituted with —N=), hydrogen atoms in the group (a) and the group (b) may each independently be substituted with a cyano group, a fluorine atom, or a chlorine atom, $Z^{M1}$ and $Z^{M2}$ each independently represent a single bond, —CH$_2$CH$_2$—, —(CH$_2$)$_4$—, —OCH$_2$—, —CH$_2$O—, —OCF$_2$—, —CF$_2$O—, —COO—, —OCO—, or —C≡C—, when $n^{M1}$ represents 2, 3, or 4 and two or more $A^{M2}$ are present, they may be the same or different and when $n^{M1}$ represents 2, 3, or 4 and two or more $Z^{M1}$ are present, they may be the same or different, $X^{M1}$ and $X^{M2}$ each independently represent a hydrogen atom, a chlorine atom, or a fluorine atom, and $Y^{M1}$ represents a hydrogen atom, a fluorine atom, a chlorine atom, a cyano group, a trifluoromethyl group, a fluoromethoxy group, a difluoromethoxy group, a trifluoromethoxy group, or a 2,2,2-trifluoroethyl group).

3. The composition according to claim 1, further comprising at least one compound represented by general formula (L):

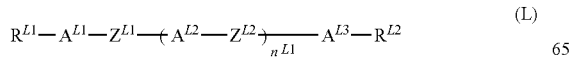

(L)

(In the formula, $R^{L1}$ and $R^{L2}$ each independently represent an alkyl group having 1 to 8 carbon atoms and one —CH$_2$— or two or more nonadjacent —CH$_2$— in the alkyl group may each independently be substituted with —C≡C—, —O—, —CO—, —COO—, or —OCO—, $n^{L1}$ represents 0, 1, 2, or 3, $A^{L1}$, $A^{L2}$, and $A^{L3}$ each independently represent a group selected from the group consisting of (a) a 1,4-cyclohexylene group (one —CH$_2$— or two or more nonadjacent —CH$_2$— in this group may each be substituted with —O—), (b) a 1,4-phenylene group (one —CH= or two or more nonadjacent —CH= in this group may each be substituted with —N=), and (c) (c) a naphthalene-2,6-diyl group, a 1,2,3,4-tetrahydronaphthalene-2,6-diyl group, or a decahydronaphthalene-2,6-diyl group (one —CH= or two or more nonadjacent —CH= in the naphthalene-2,6-diyl group or the 1,2,3,4-tetrahydronaphthalene-2,6-diyl group may each be substituted with —N=), the group (a), the group (b), and the group (c) may each independently be substituted with a cyano group, a fluorine atom, or a chlorine atom, $Z^{L1}$ and $Z^{L2}$ each independently represent a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF—, or —C≡C—, and when $n^{L1}$ represents 2 or 3 and two or more $A^{L2}$ are present, they may be the same or different; when $n^{L1}$ represents 2 or 3 and two or more $Z^{L2}$ are present, they may be the same or different; however, compounds represented by general formulae (i), (ii), and (M) are excluded).

4. A liquid crystal display device that uses the composition according to claim 1.

5. An IPS device or FFS device that uses the composition according to claim 1.

6. The composition according to claim 1, wherein said at least one selected from the compounds represented by general formula (iii) is selected from the group represented by formulae (iii-1.1), (iii-1.2), (iii-1.3), (iii-1.4), (iii-2.1), (iii-2.2), (iii-2.3) and (iii-2.4):

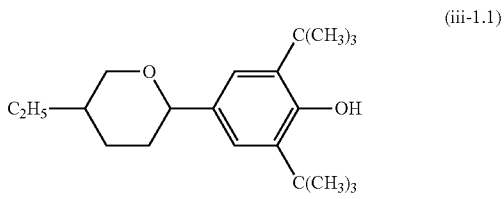

(iii-1.1)

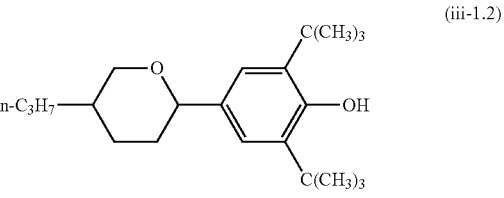

(iii-1.2)

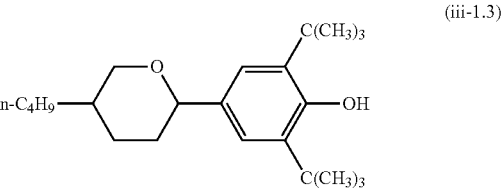

(iii-1.3)

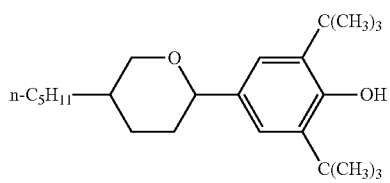
(iii-1.4)
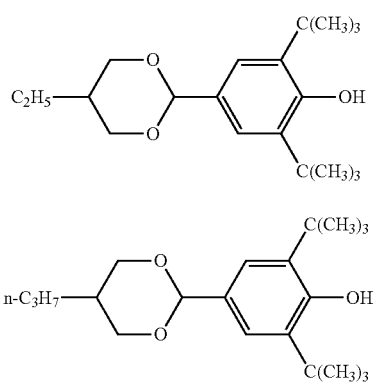
(iii-2.1)
(iii-2.2)
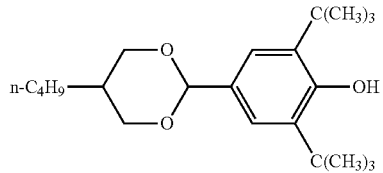
(iii-2.3)
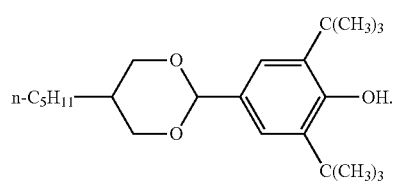
(iii-2.4)
7. The composition according to claim 1, wherein $E^{iii1}$ represents —O—.
* * * * *